(12) United States Patent
Kishida et al.

(10) Patent No.: US 9,739,973 B2
(45) Date of Patent: *Aug. 22, 2017

(54) FOCUSING SYSTEM, INTERCHANGEABLE LENS, AND IMAGE-CAPTURING DEVICE

(71) Applicant: Panasonic Intellectual Property Management Co., Ltd., Osaka (JP)

(72) Inventors: Naotaka Kishida, Osaka (JP); Kenji Kawazoe, Hyogo (JP)

(73) Assignee: Panasonic Intellectual Property Managemnet Co., Ltd., Osaka (JP)

( * ) Notice: Subject to any disclaimer, the term of this patent is extended or adjusted under 35 U.S.C. 154(b) by 51 days.

This patent is subject to a terminal disclaimer.

(21) Appl. No.: 14/712,708

(22) Filed: May 14, 2015

(65) Prior Publication Data

US 2015/0247988 A1 Sep. 3, 2015

Related U.S. Application Data

(63) Continuation of application No. 13/503,059, filed as application No. PCT/JP2010/005791 on Sep. 27, 2010, now Pat. No. 9,097,961.

(30) Foreign Application Priority Data

Oct. 22, 2009 (JP) ................... 2009-243016

(51) Int. Cl.
*G02B 9/04* (2006.01)
*G02B 7/09* (2006.01)
(Continued)

(52) U.S. Cl.
CPC .............. *G02B 7/09* (2013.01); *G02B 7/08* (2013.01); *G02B 7/102* (2013.01); *G02B 7/14* (2013.01);
(Continued)

(58) Field of Classification Search
CPC ............ H04N 5/23212; H04N 5/2254; H04N 5/23209; G02B 13/003; G02B 13/04
(Continued)

(56) References Cited

U.S. PATENT DOCUMENTS 4,881,799 A * 11/1989 Ohno et al. ................... 359/698
5,016,993 A * 5/1991 Akitake ........................ 359/696
(Continued)

FOREIGN PATENT DOCUMENTS

| JP | 1-158882 | 6/1989 |
|---|---|---|
| JP | 2-282212 | 11/1990 |

(Continued)

OTHER PUBLICATIONS

International Search Report of PCT Application No. PCT/JP2010/005791, dated Nov. 9, 2010.
(Continued)

*Primary Examiner* — James Greece
(74) *Attorney, Agent, or Firm* — Panasonic IP Management

(57) ABSTRACT

A focusing system includes a first drive unit for driving a first focus lens along the optical axis, a second drive unit for driving a second focus lens along the optical axis, a determining unit for periodically detecting a focus state of a subject image formed via the optical system and determining a focus position of the optical system based on the detected result, and a control unit for controlling the first and second drive units according to a result of determining the focus position of the optical system by the determining unit. The control unit controls the second drive unit to drive the second focus lens independently of the first focus lens, in the focus operation.

5 Claims, 23 Drawing Sheets

(51) Int. Cl.
| | |
|---|---|
| *G02B 7/08* | (2006.01) |
| *G02B 7/10* | (2006.01) |
| *G03B 13/36* | (2006.01) |
| *H04N 5/225* | (2006.01) |
| *H04N 5/232* | (2006.01) |
| *G02B 7/14* | (2006.01) |
| *G02B 7/28* | (2006.01) |
| *G02B 13/00* | (2006.01) |

(52) U.S. Cl.
CPC ............. *G02B 7/28* (2013.01); *G02B 13/001* (2013.01); *G03B 13/36* (2013.01); *H04N 5/2254* (2013.01); *H04N 5/23209* (2013.01); *H04N 5/23212* (2013.01)

(58) Field of Classification Search
USPC .................. 359/793; 348/335–340, 345–357
See application file for complete search history.

(56) References Cited

U.S. PATENT DOCUMENTS

| | | | |
|---|---|---|---|
| 5,144,491 A | | 9/1992 | Ushiro et al. |
| 5,281,796 A | * | 1/1994 | Kaneda et al. ............ 250/201.2 |
| 5,402,175 A | * | 3/1995 | Tanaka .......................... 348/351 |
| 6,169,578 B1 | | 1/2001 | Chigira ......................... 348/347 |
| 2002/0154241 A1 | | 10/2002 | Ohkawara ..................... 348/345 |
| 2003/0030920 A1 | * | 2/2003 | Okawara ....................... 359/823 |
| 2003/0137748 A1 | | 7/2003 | Mukaiya |
| 2005/0083429 A1 | * | 4/2005 | Yasuda ......................... 348/345 |
| 2005/0168622 A1 | | 8/2005 | Kawai et al. |
| 2006/0140613 A1 | | 6/2006 | Aikawa ......................... 396/133 |
| 2006/0203119 A1 | * | 9/2006 | Masuda ........................ 348/347 |
| 2007/0229672 A1 | | 10/2007 | Kaneda ....................... 348/218.1 |
| 2009/0135291 A1 | | 5/2009 | Sugimoto ..................... 348/347 |
| 2011/0050982 A1 | * | 3/2011 | Katsuyama et al. .......... 348/345 |

FOREIGN PATENT DOCUMENTS

| | | |
|---|---|---|
| JP | 2687292 B | 8/1997 |
| JP | 2003-262780 | 9/2003 |
| JP | 2004-258087 | 9/2004 |
| JP | 2005-215386 | 8/2005 |
| JP | 2006-3462 | 1/2006 |
| JP | 2006-154473 | 6/2006 |
| JP | 2006-322984 | 11/2006 |

OTHER PUBLICATIONS

Translation of the International Preliminary Report on Patentability (PCT/IB/373) mailed on May 15, 2012 with PCT/ISA/237 for corresponding application PCT/JP2010/005791.

* cited by examiner

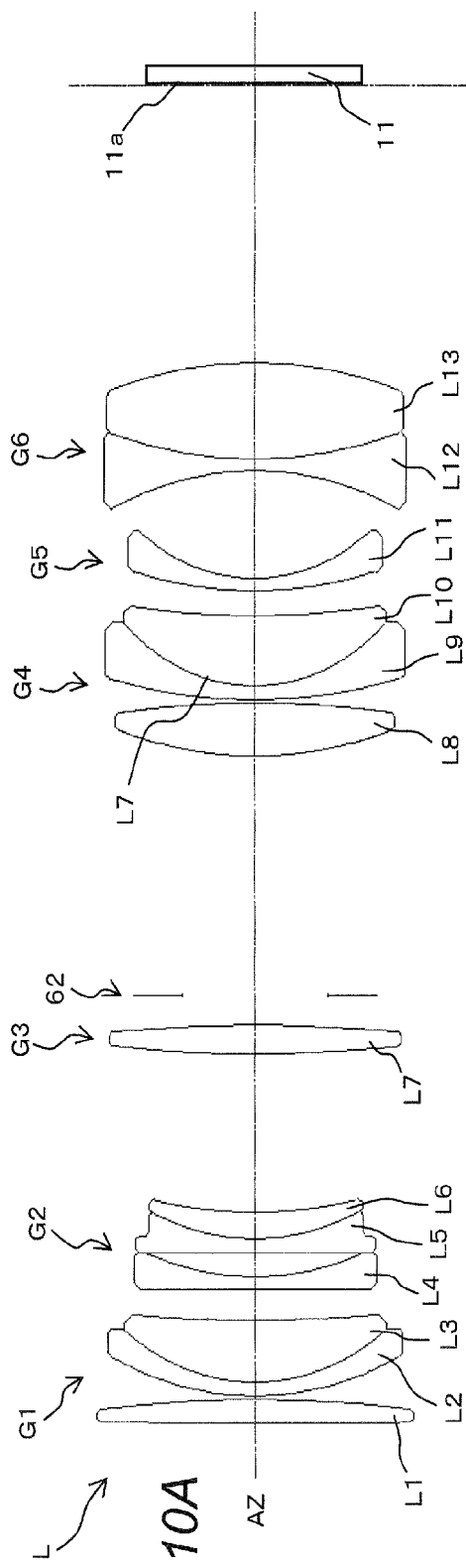
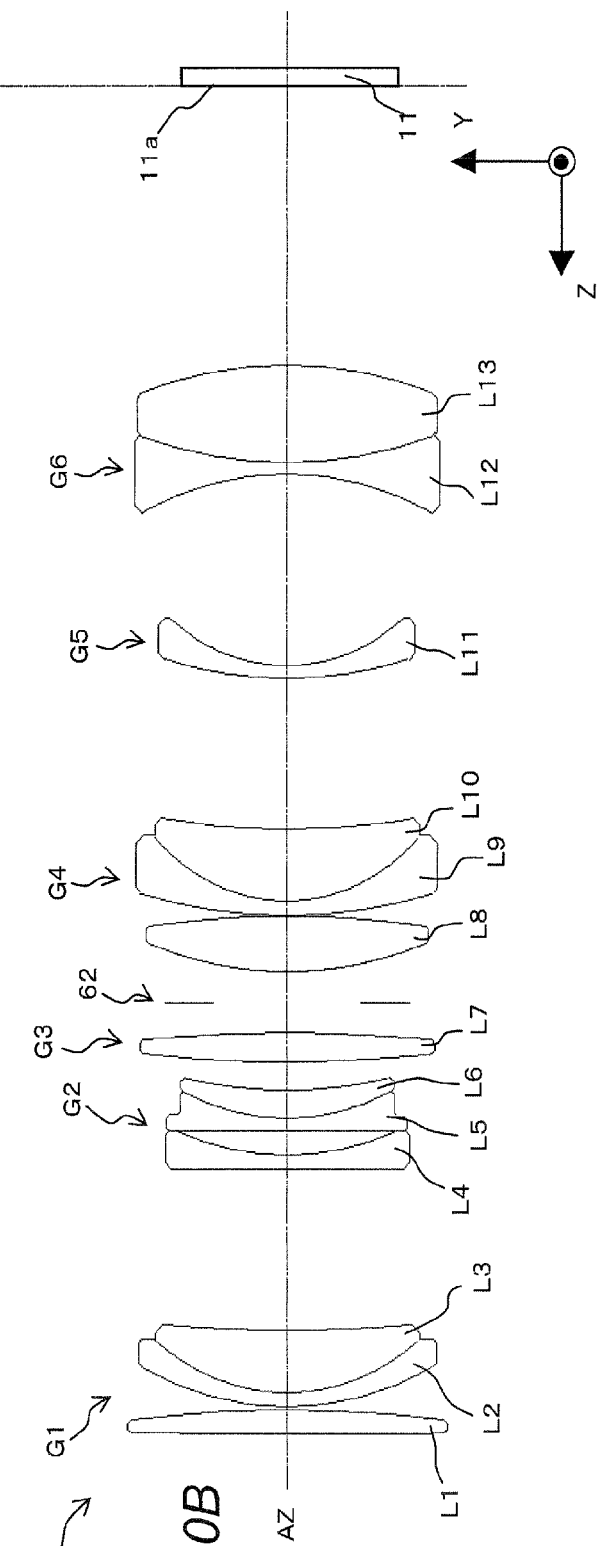
Fig. 10A
Fig. 10B

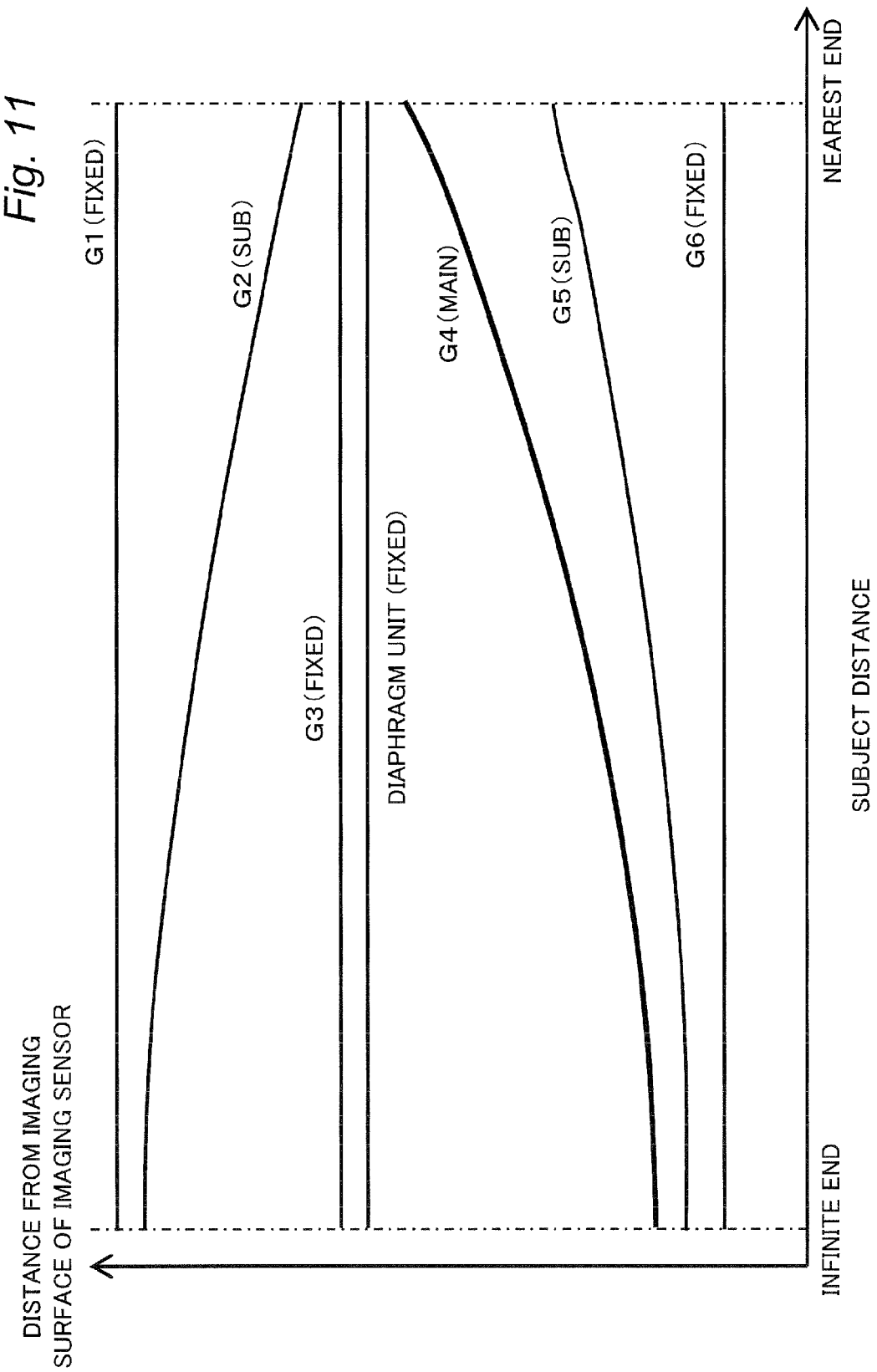

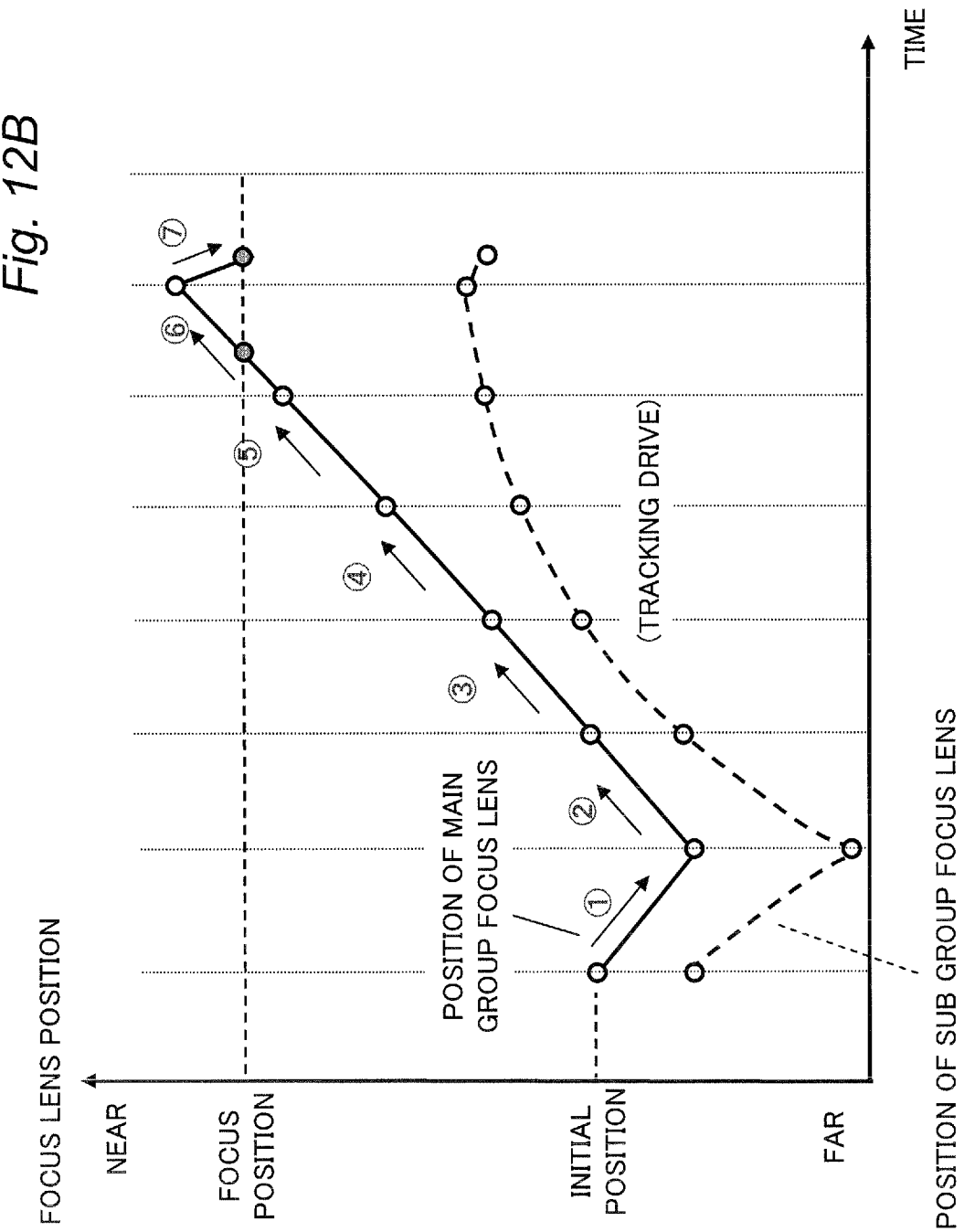

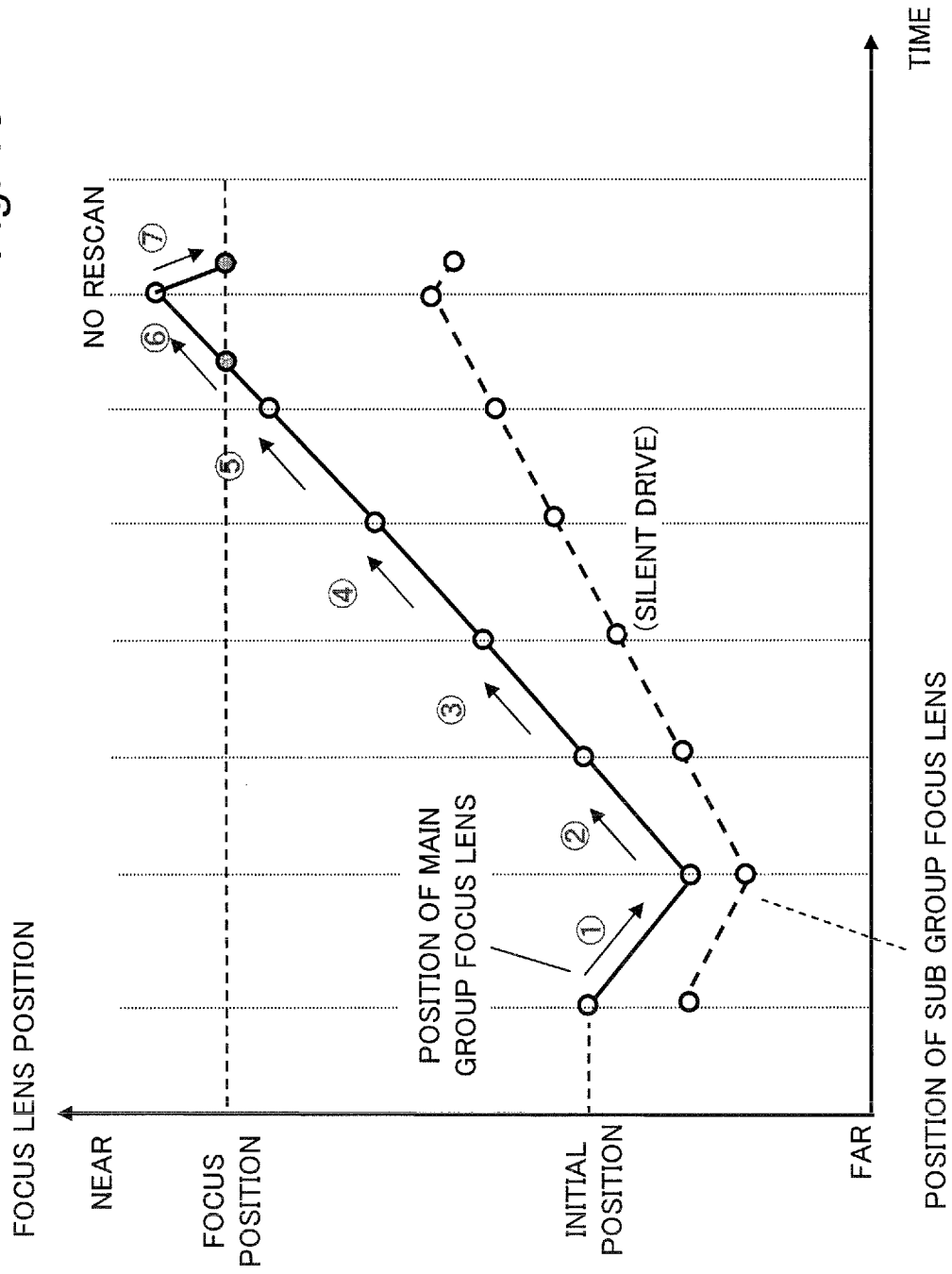

FOCUSING SYSTEM, INTERCHANGEABLE LENS, AND IMAGE-CAPTURING DEVICE

TECHNICAL FIELD

The present invention relates to a focusing system that has an optical system including a plurality of focus lens groups and is capable of performing automatic focus detection, and an interchangeable lens and an image-capturing device equipped with such a focusing system.

BACKGROUND ART

In camera systems, miniaturization of lens barrels is highly demanded and heightening of an autofocus speed is required. With a focusing system composed of a plurality of focus lens groups, a stroke length is made shorter than that with the focusing system composed of a single focus lens group. Thus, an entire length of a lens barrel can be shortened and an autofocus speed is heightened. Particularly in macro lenses, a deterioration in a performance of macro regions can be improved.

For example, a lens barrel described in Patent Document 1 has a plurality of focus lens groups, and one motor drives the plurality of focus lens groups using a cam mechanism.

PRIOR ART DOCUMENT

Patent Document

Patent Document 1: JP 2006-154473 A

DISCLOSURE OF INVENTION

Problem to be Solved by the Invention

A focusing system composed of a plurality of focus lens groups are composed of a main group focus lens to be driven to scan a focus position, and a sub group of focus lens to be driven cooperatively to secure focus accuracy for the scanning of the main group focus lens. In such focusing systems including a plurality of drive systems, noises may be generated due to drive and tone occasionally may change.

Particularly, during recording of moving images, the main group focus lens is always driven slightly to continuously scan the focus position. Since sound recording is normally carried out in the recording of moving images, the generation of noises and the change in the tone cause a deterioration in sound quality, thereby resulting in a problem.

The present invention is devised in view of the above problem, and its object is to solve the problem of a sound generated by drive of a focusing system composed of a plurality of focus lens groups.

Means for Solving the Problem

In a first aspect, a focusing system is provided which has an optical system including first and second focus lenses for regulating a focus state of a subject image, the focusing system being capable of performing a focus operation for automatically controlling the first and second focus lenses on a focus position. The focusing system includes a first drive unit for driving the first focus lens along the optical axis, a second drive unit for driving the second focus lens along the optical axis, a determining unit for periodically detecting a focus state of the subject image formed via the optical system and determining a focus position of the optical system based on the detected result in the focus operation, and a control unit for controlling the first and second drive unit according to a result of determining the focus position of the optical system by the determining unit. The control unit controls the second drive unit to drive the second focus lens independently of the first focus lens in the focus operation.

In a second aspect, for example, the control unit may control the first drive unit to drive the first focus lens slightly forward and backward along the optical axis and control the second drive unit to drive the second focus lens independently of the first focus lens, in order to detect a focus state of the subject image by the determining unit in the focus operation.

Specifically, the control unit may control the first drive unit to drive the first focus lens slightly forward and backward along the optical axis and control the second drive unit to drive the second focus lens at a constant speed, in order to determine the focus position of the optical system by the determining unit.

Alternatively, when a center position of the first focus lens in driving slightly forward and backward shifts, the control unit may control the second drive unit to drive the second focus lens at a constant speed.

Alternatively, when the center position of the first focus lens in driving slightly forward and backward shifts and a difference between a tracking position of the second focus lens with respect to a current position of the first focus lens and a current position of the second focus lens is equal to or more than a predetermined value, the control unit may control the second drive unit to drive the second focus lens at a constant speed.

In a third aspect, the control unit may control the first drive unit to drive the first focus lens to set the subject image in an in-focus state and control the second drive unit to drive the second focus lens independently of the first focus lens based on the determined result of the determining unit in the focus operation.

Specifically, the control unit may control the first drive unit to drive the first focus lens to set the subject image in the in-focus state and control the second drive unit to drive the second focus lens independently of the first focus lens based on the determined result of the determining unit in the focus operation.

Alternatively, the control unit may control the second drive unit to drive the second focus lens at a constant speed until the determining unit determines the focus position of the optical system.

Alternatively, the control unit may control the second drive unit to stop the second focus lens until the determining unit determines the focus position of the optical system.

Alternatively, when a difference between a tracking position of the second focus lens with respect to a current position of the first focus lens and a current position of the second focus lens is not less than a predetermined value, the control unit may control the second drive unit to drive the second focus lens.

Alternatively, the determining unit may firstly detect the focus position, and then secondly determine the focus position based on the detected result.

In this case, when driving the first focus lens to secondly determine the focus position after the first focus lens passes through the focus position which is firstly determined as a focus position, the control unit may control the second drive unit to transfer the second focus lens according to the tracking position of the second focus lens with respect to the current position of the first focus lens.

Alternatively, when driving the first focus lens to secondly determine the focus position after the first focus lens passes through the focus position which is firstly determined as a focus position, the control unit may not start driving of the first focus lens until the second focus lens reaches the tracking position when the difference between the tracking position of the second focus lens with respect to the current position of the first focus lens and the current position of the second focus lens is not less than the predetermined value.

Alternatively, after the determining unit detects a position where the subject image is in-focus, the control unit may control the second drive unit to drive the second focus lens at the constant speed to set the subject image in the in-focus state.

In a fourth aspect, an image-capturing device is provided, which includes the focusing system having the above configuration.

In a fifth aspect, an interchangeable lens mountable to a camera body is provided, which includes the focusing system having the above configuration.

Effect of the Invention

According to the above configuration, in the focusing system composed of the focus lens groups, the second focus lens is driven independently of the first focus lens at the time of the focus operation. As a result, the second focus lens can be driven at the constant speed or stopped in the focus operation, thereby preventing noises and a change in tone caused by a change in a drive speed of the second focus lens. As a result, noise reduction and quality of recorded sounds can be improved.

BRIEF DESCRIPTION OF DRAWINGS

FIG. 10A is a diagram of configuration of an optical system in the in-focus state at a infinite end,
and FIG. 10B is a diagram of configuration of an optical system in an in-focus state at a nearest end.
FIG. 11 is a diagram illustrating a positional relationship of the respective lens groups at the time of focusing (tracking curves).
FIG. 12B is an explanatory diagram illustrating the focus detection in the hill climbing system (tracking drive).
FIG. 13 is an explanatory diagram illustrating a focus detection driving method in the hill climbing system according to a first embodiment.

MODE FOR CARRYING OUT THE INVENTION

First Embodiment

A configuration and an operation of a digital camera according to a first embodiment are described below with reference to accompanying drawings.

1. Configuration 1-1. Entire Configuration

Figure 1:
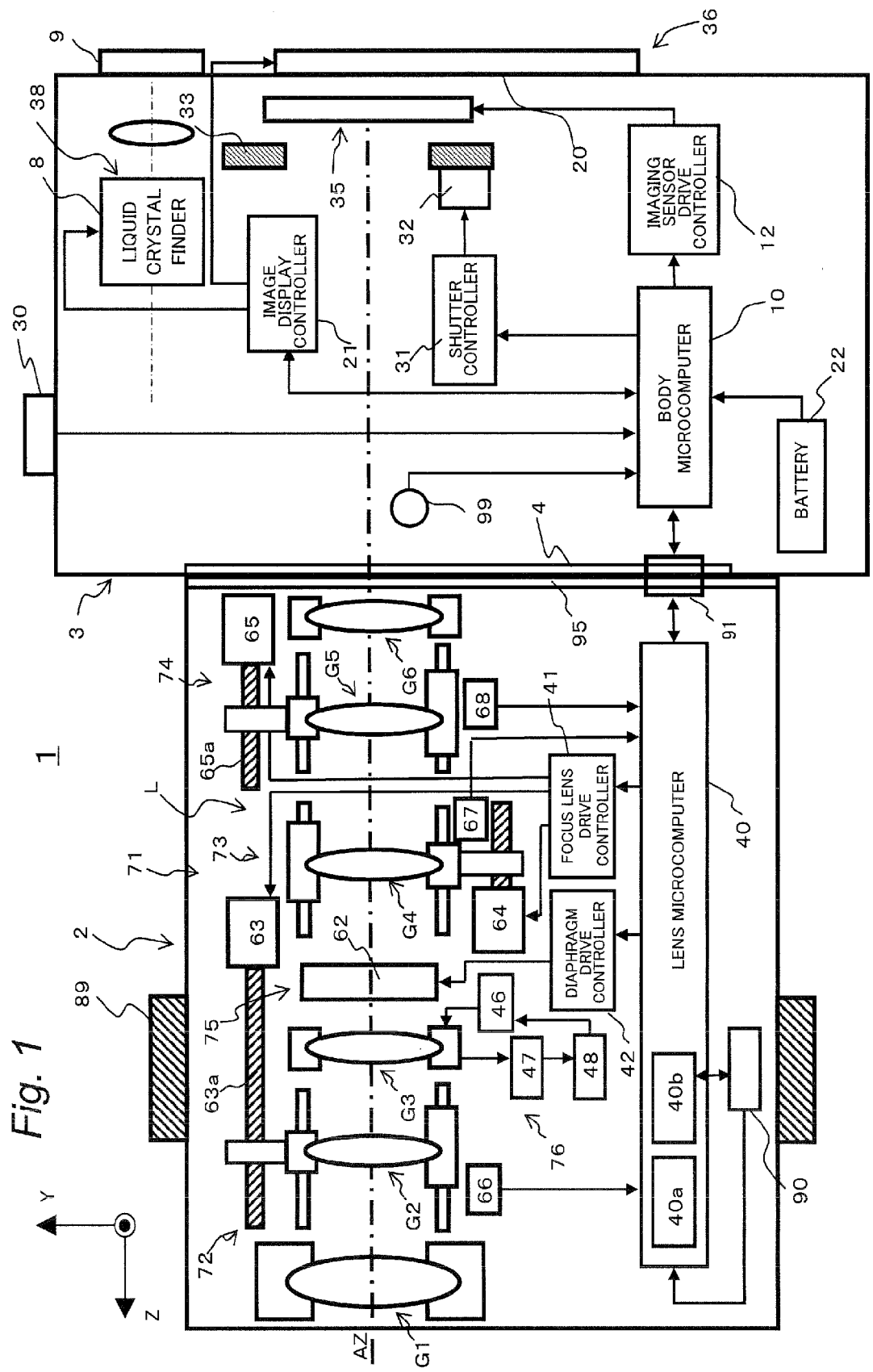
FIG. 1 is a diagram of configuration of a digital camera.

An outline of a digital camera 1 is described with reference to FIG. 1. FIG. 1 is a schematic diagram illustrating a configuration of the digital camera 1. As shown in FIG. 1, the digital camera 1 (one example of an image-capturing device), that is an interchangeable lens type digital camera, has a camera body 3 and a detachable interchangeable lens unit 2 attached to the camera body 3. The interchangeable lens unit 2 is attached to the camera body 3 via a lens mount 95 and a body mount 4 provided to a front surface of the camera body 3.

Figure 2:
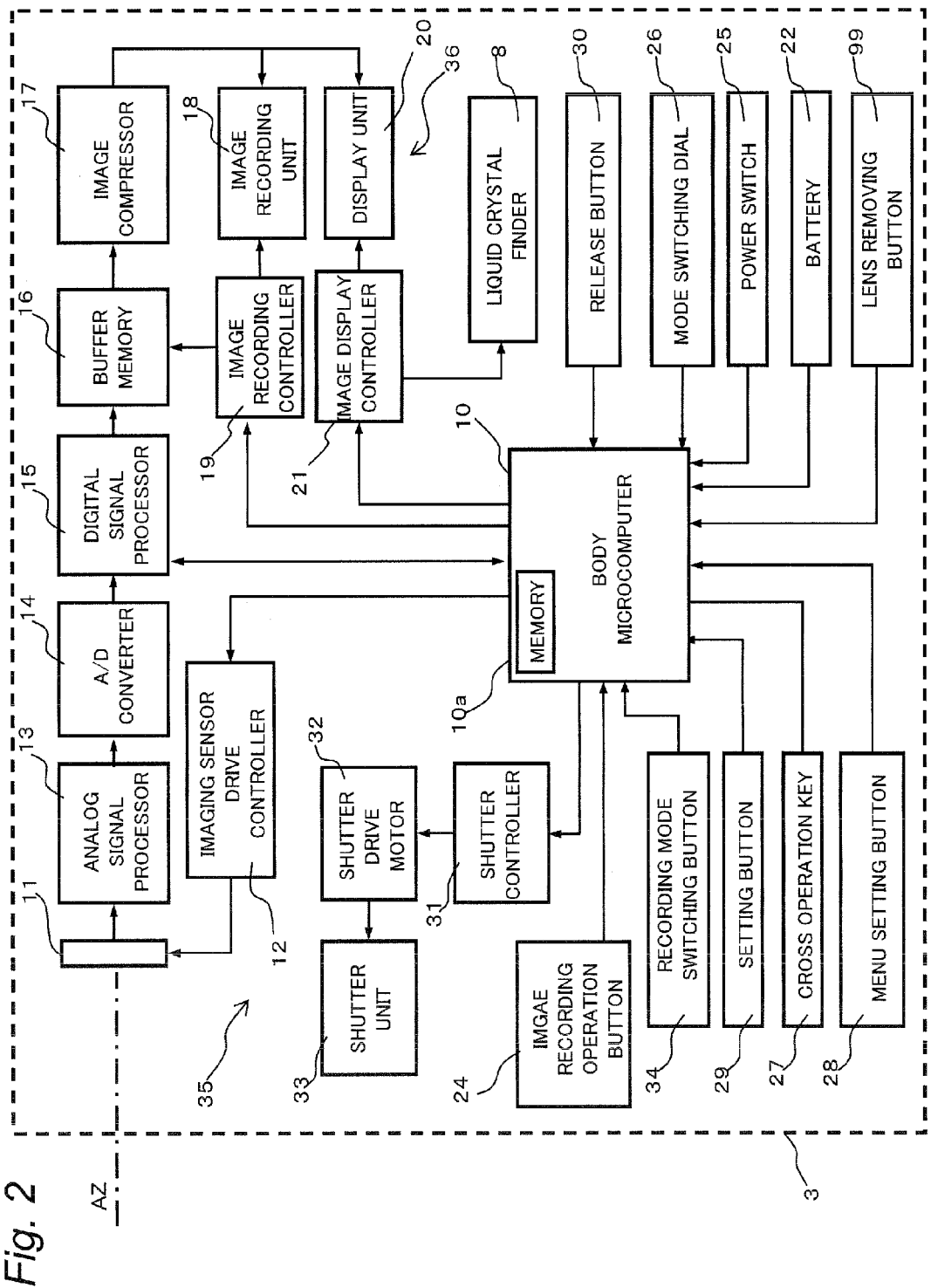
FIG. 2 is a block diagram of a camera body.
Figure 3:
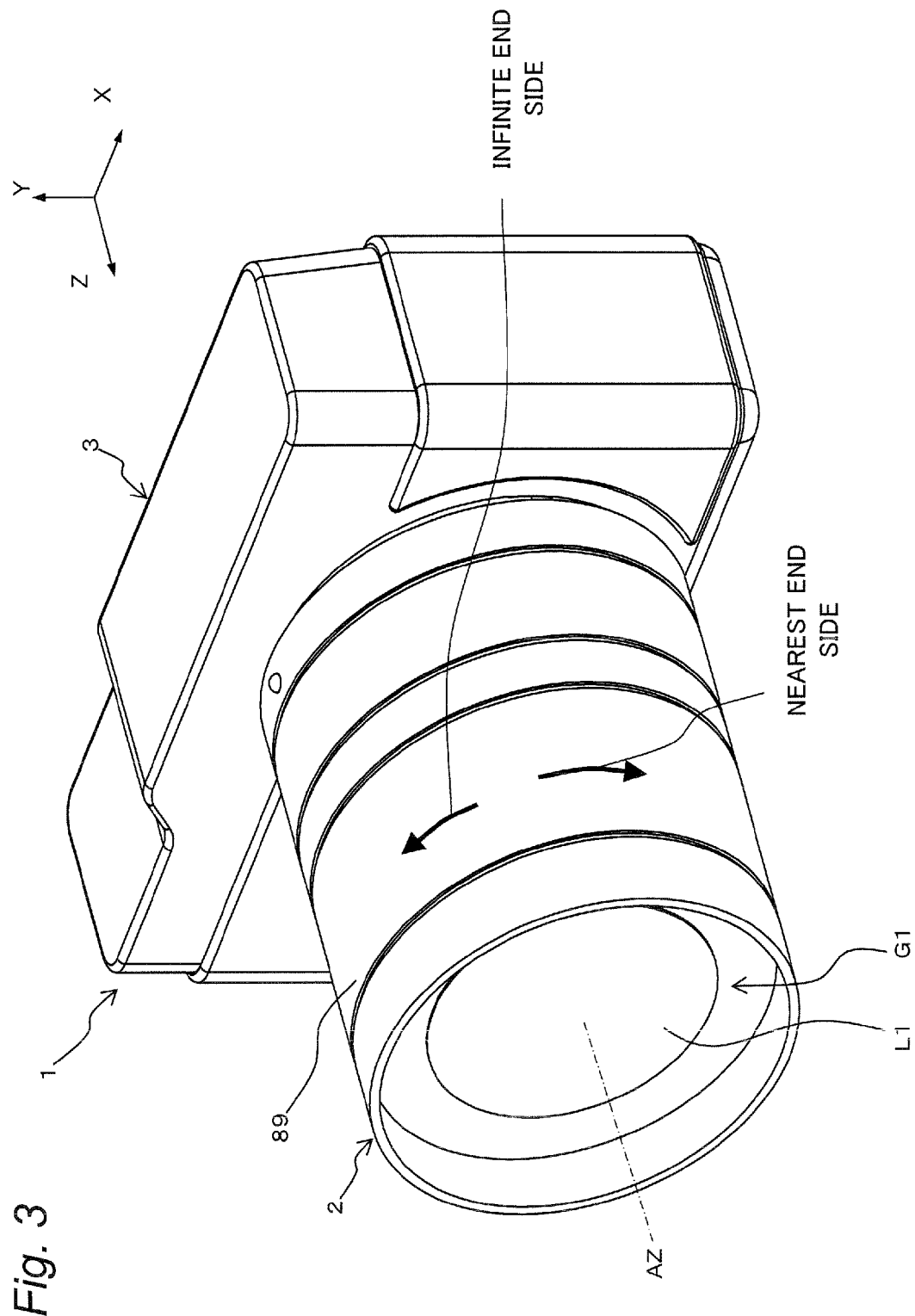
FIG. 3 is a perspective view of the digital camera.
Figure 4A:
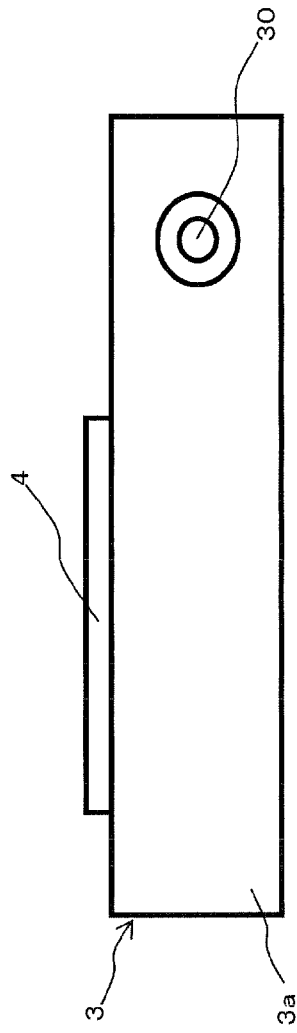
FIG. 4A is a top view illustrating the camera body.
Figure 4B:
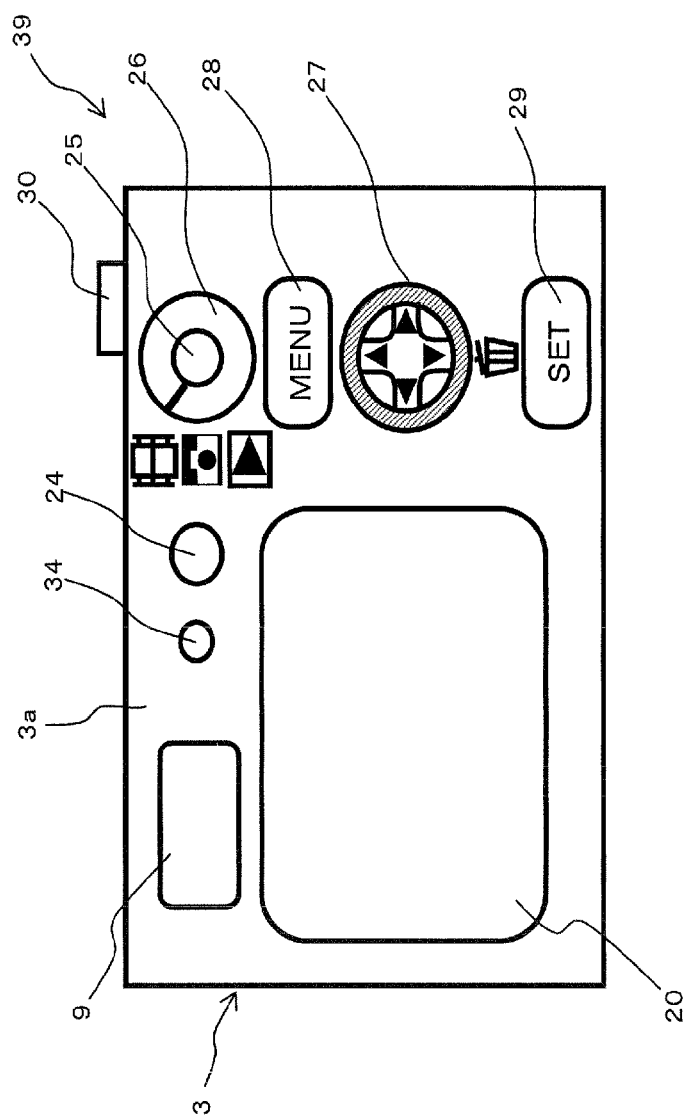
FIG. 4B is a rear view illustrating the camera body.
Figure 5:
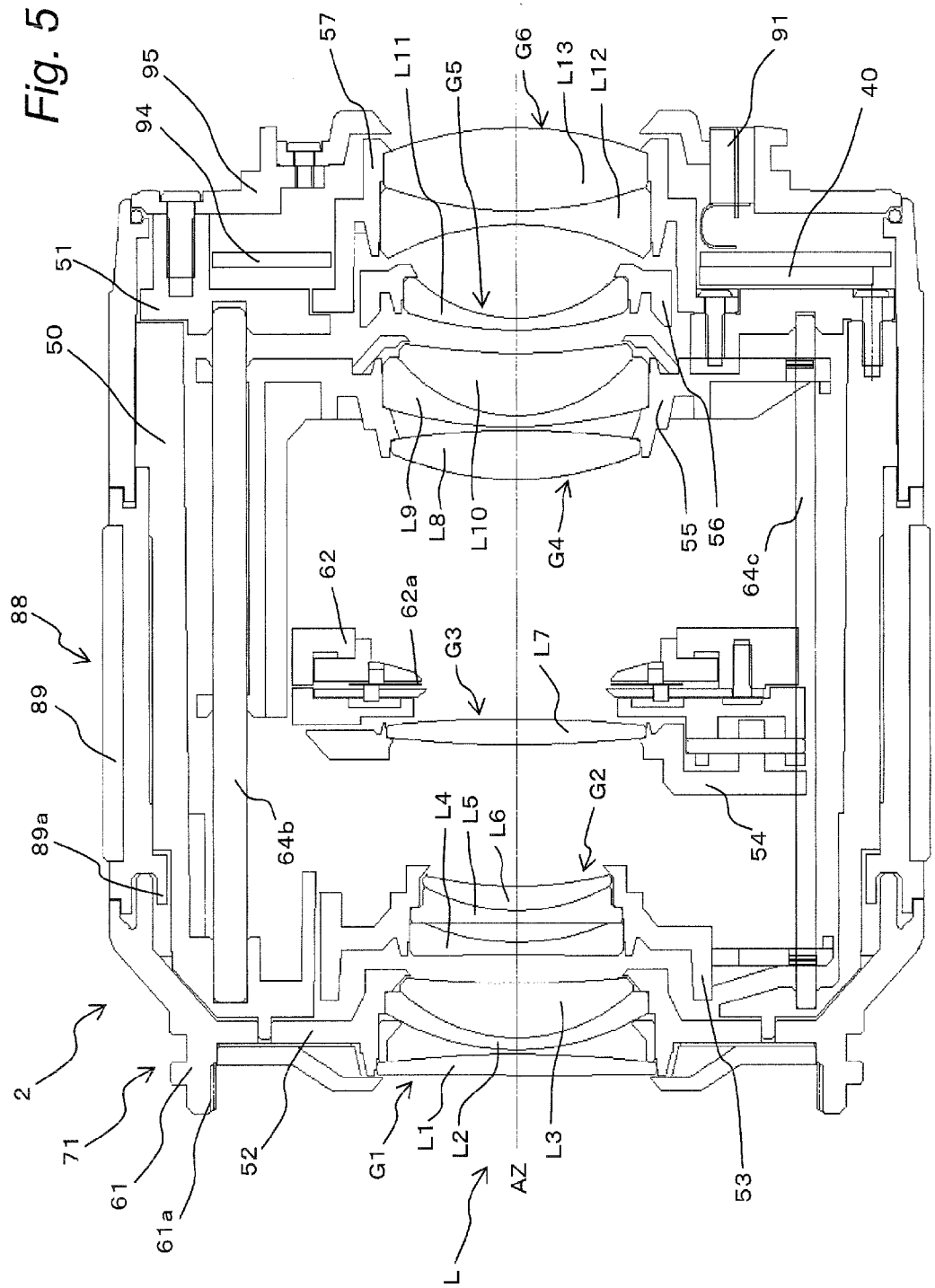
FIG. 5 is a cross-sectional view illustrating an interchangeable lens unit (an in-focus state at infinite end).
Figure 6:
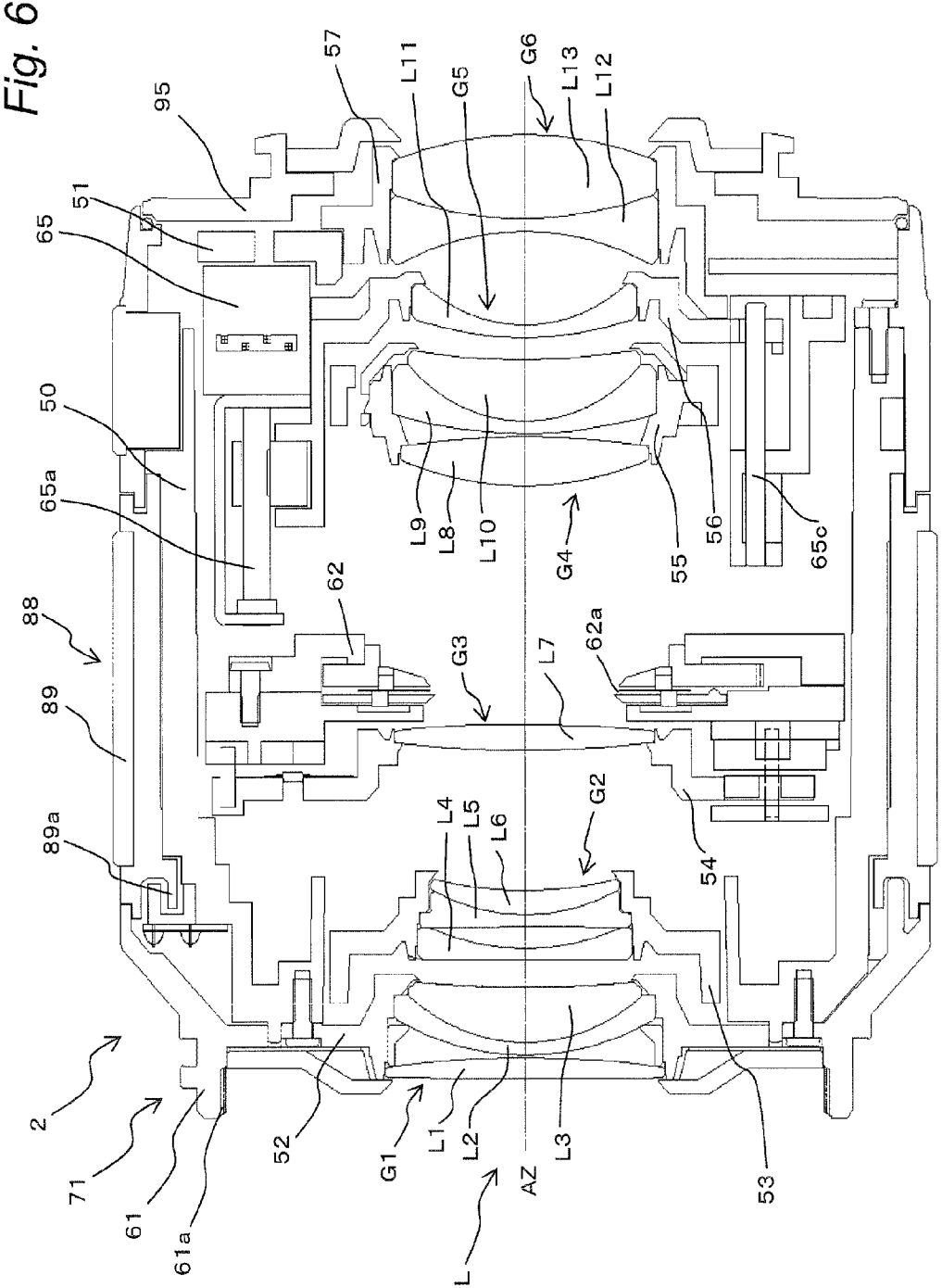
FIG. 6 is a cross-sectional view illustrating the interchangeable lens (an in-focus state at infinite end).
Figure 7:
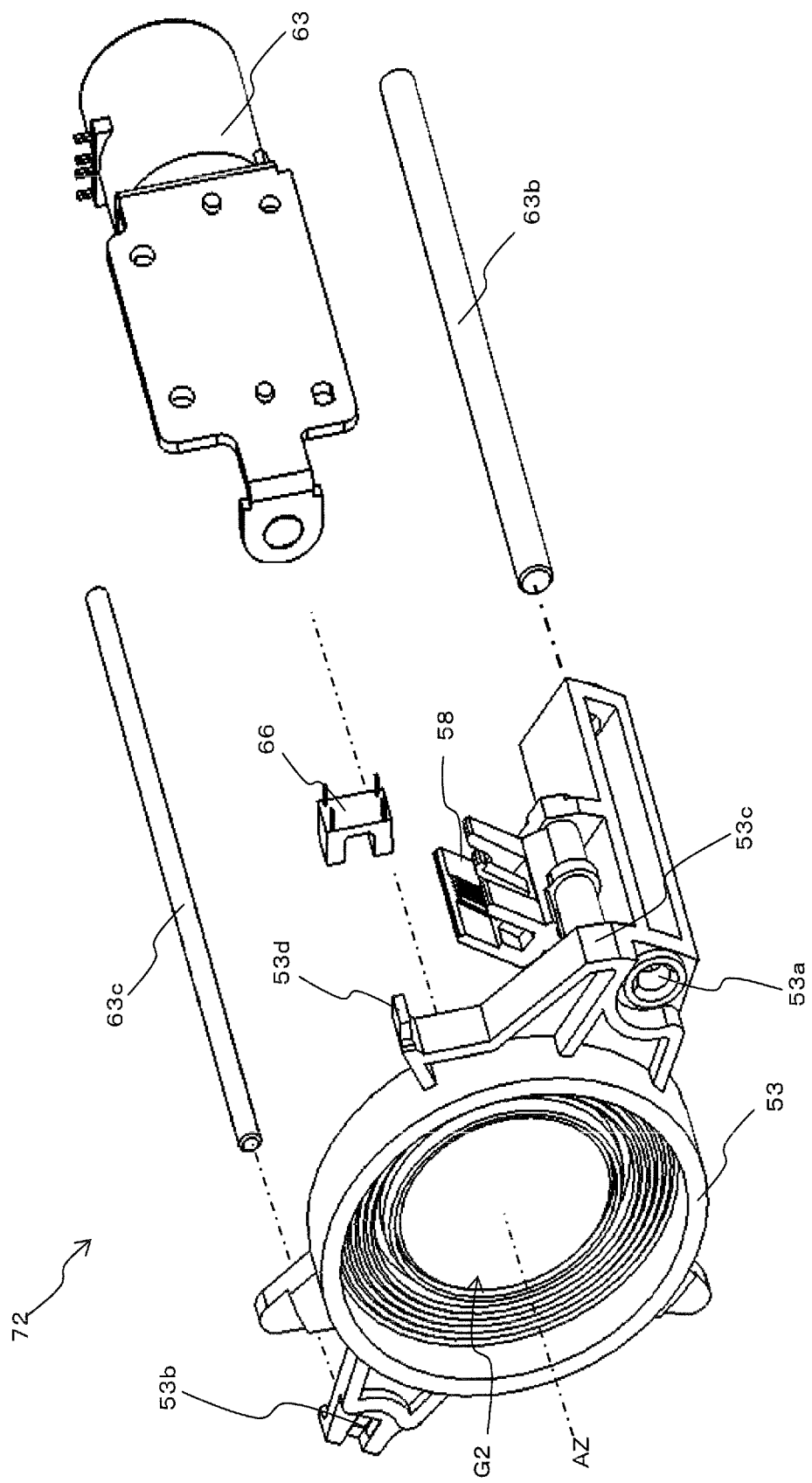
FIG. 7 is an exploded perspective view illustrating a second lens group unit.
Figure 8:
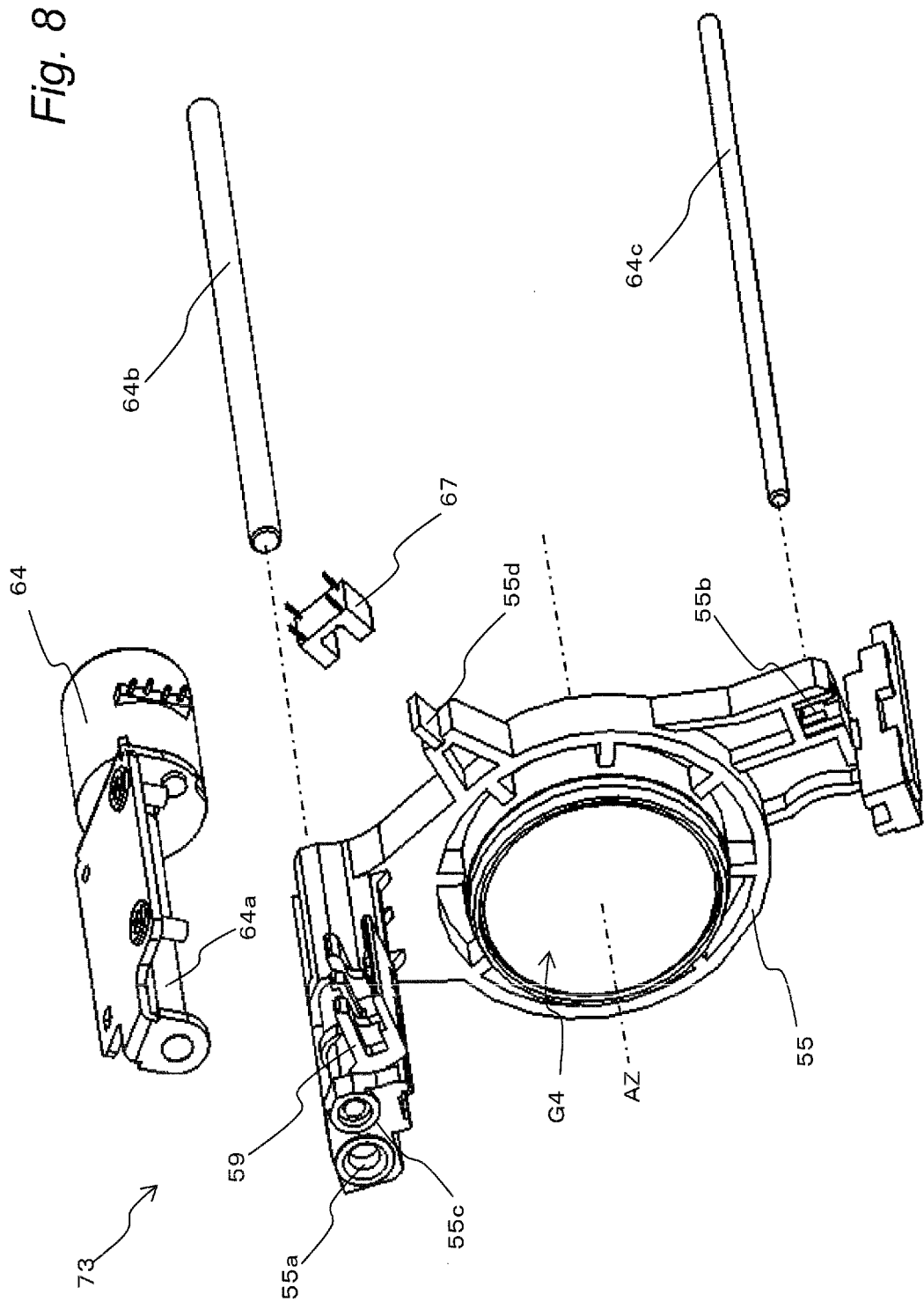
FIG. 8 is an exploded perspective view illustrating a fourth lens group unit.
Figure 9:
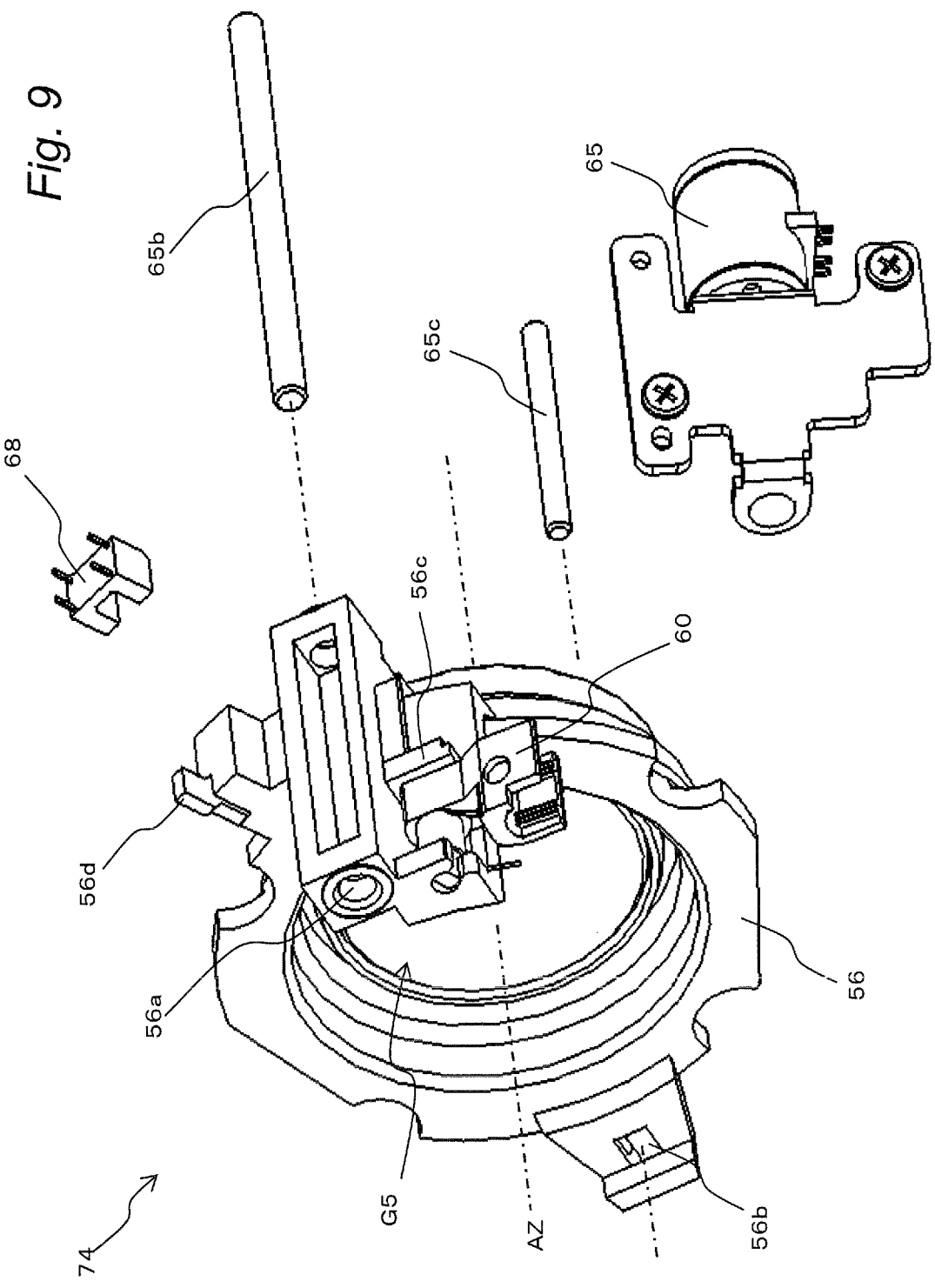
FIG. 9 is an exploded perspective view illustrating a fifth lens group unit.

FIG. 2 is a block diagram illustrating a configuration of the camera body 3. FIG. 3 is a schematic perspective view of the digital camera 1. FIG. 4A is a top view illustrating the camera body 3, and FIG. 4B is a rear view illustrating the camera body 3. FIGS. 5 to 6 are schematic cross-sectional views illustrating the interchangeable lens unit 2 that is cut along different planes. FIG. 7 is an exploded perspective view illustrating a first focus regulating unit 72. FIG. 8 is an exploded perspective view illustrating a second focus regulating unit 73. FIG. 9 is an exploded perspective view illustrating a third focus regulating unit 74. FIGS. 10A and 10B are diagrams illustrating a configuration of an optical system L. FIG. 10A illustrates an in-focus state at an infinite end, and FIG. 10B illustrates an in-focus state at a nearest end. FIG. 11 illustrates distances from imaging sensors 11 of respective lens groups at the time of focusing.

In the first embodiment, a three-dimensional orthogonal coordinate system is set in the digital camera 1. An optical axis AZ of the optical system L (described later) matches with a Z-axis direction. The X-axis direction matches with a horizontal direction of the digital camera 1 held for shooting a portrait-oriented image. A Y-axis direction matches with a vertical direction of the digital camera 1 which is held for shooting a landscape-oriented image. Further, in the following description, "front" means a side of a subject of the digital camera 1 (a positive side in the Z-axis direction), and "rear" means a side opposite to the subject side of the digital camera 1 (on a side of the imaging sensor, a negative side in a Z-axis direction).

1-2. Interchangeable Lens Unit

A schematic structure of the interchangeable lens unit 2 is described with reference to FIGS. 1 to 11. As shown in FIG. 1, the interchangeable lens unit 2 has the optical system L, a lens supporting mechanism 71 for supporting the optical system L, the first focus regulating unit 72, the second focus regulating unit 73, a third focus regulating unit 74, a diaphragm regulating unit 75, a shake correcting unit 76, and a lens microcomputer 40.

The optical system L forms an optical image of a subject. The optical system L is mainly composed of six lens groups. Concretely, as shown in FIGS. 10A and 10B, the optical system L has a first lens group G1 having a positive refractive power, a second lens group G2 having a negative refractive power, a third lens group G3 having a positive refractive power, a fourth lens group G4 having a positive refractive power, a fifth lens group G5 having a negative refractive power, and a sixth lens group G6 having a positive refractive power.

The first lens group G1 includes a first lens L1, a second lens L2, and a third lens L3. The second lens group G2 is a focus lens group, and includes a fourth lens L4, a fifth lens L5 and a sixth lens L6. The third lens group G3 is a shake correcting lens group, and includes a seventh lens L7. The fourth lens group G4 is a focus lens group and includes an eighth lens L8, a ninth lens L9 and a tenth lens L10. The fifth lens group G5 is a focus lens group and includes an eleventh lens L11. The sixth lens group G6 includes a twelfth lens L12 and a thirteenth lens L13.

That is to say, in the optical system L, the lens groups G2, G4 and G5 are focus lens groups. The focus lens groups G2, G4 and G5 transfer along the optical axis to change an imaging distance (object distance).

As shown in FIGS. 10A, 10B and 11, in focusing from the in-focus state at an infinite end to the in-focus state at a nearest-end, the second lens group G2 transfers to the imaging sensor 11 along the optical axis AZ, and the fourth lens group G4 and the fifth lens group G5 transfer to the subject side along the optical axis AZ.

Further, in order to repress a shake of an optical image caused by a movement of the digital camera 1, the seventh lens L7 transfers to two directions perpendicular to the optical axis AZ.

FIG. 11 is a diagram illustrating tracking curves of the respective focus lens groups according to the first embodiment. As shown in FIG. 11, when the respective focus lens groups transfer from the in-focus state at the infinite end to the in-focus state at the nearest end, they establish a predetermined positional relationship.

In FIGS. 1, 5 and 6, the lens supporting mechanism 71 is a mechanism for fixing or movably supporting the respective lens groups G1 to G6 of the optical system L, and has a lens mount 95, a fixing frame 50, a guide pole supporting frame 51, a first lens group supporting frame 52, a second lens group supporting frame 53, a third lens group supporting frame 54, a diaphragm unit 62, a fourth lens group supporting frame 55, a fifth lens group supporting frame 56, a sixth lens group supporting frame 57, and a focus ring unit 88.

The lens mount 95 is a portion that is attached to the body mount 4 of the camera body 3, and has a lens side contact point 91.

The fixing frame 50 supports a front frame 61, the first lens group supporting frame 52, the diaphragm unit 62, a first focus motor 63 and a second focus motor 64. The fixing frame 50 further supports front end portions of four guide poles 63b, 63c, 64b and 64c extending to the Z axis direction, and is fixed to the guide pole supporting frame 51. The first focus motor 63 and the second focus motor 64 are, for example, stepping motors.

The guide pole supporting frame 51 supports the sixth lens group supporting frame 57, guide poles 65c and 65b and a third focus motor 65, and supports rear end portions of the four guide poles 63b, 63c, 64b and 64c. The guide pole supporting frame 51 is fixed to the lens mount 95. The third focus motor 65 is, for example, a stepping motor.

The front frame 61 is fixed to the fixing frame 50, and a female thread portion 61a for mounting an optical filter, such as a polarization filter or a protective filter, and a conversion lens is formed on its front end.

The first lens group supporting frame 52 is fixed to the fixing frame 50 and supports the first lens group G1.

The second lens group supporting frame 53 supports the second lens group G2, and has a bearing section 53a, a whirl stop section 53b, a rack supporting section 53c and a protrusion 53d. The guide pole 63b is inserted into the bearing section 53a, the guide pole 63c is inserted into the whirl stop section 53b, and the second lens group supporting frame 53 is supported movably to the Z axis direction in a state that its rotation about the optical axis AZ is regulated. The rack supporting section 53c supports a first rack 58 integrally with the Z axis direction and movably and rotatably. The protrusion 53d is a portion for detecting an original point of the second lens group G2, and is provided to a position where it can pass through a detection region of a first photosensor 66. The first rack 58 has a plurality of teeth (not shown), and these teeth are geared with a lead screw 63a of the first focus motor 63.

The third lens group supporting frame 53 supports the third lens group G3. The third lens group supporting frame 54 is supported movably to two directions perpendicular to the optical axis AZ.

The fourth lens group supporting frame 55 supports the fourth lens group G4, and has a bearing section 55a, a whirl stop section 55b, a rack supporting section 55c and a protrusion 55d. The guide pole 64b is inserted into the bearing section 55a, and the guide pole 64c is inserted into the whirl stop section 55b. The fourth lens group supporting frame 55 is supported movably to the Z axis direction in a state that its rotation about the optical axis ZA is regulated. The rack supporting section 55c supports a second rack 59 integrally, movably and rotatably in the Z axis direction. The protrusion 55d is a portion for detecting an original point of the fourth lens group G4, and is provided to a position where it can pass through a detection region of a second photosensor 67. The second rack 59 has a plurality of teeth (not shown), and these teeth are geared with a lead screw 64a of the second focus motor 64.

The fifth lens group supporting frame 56 supports the fifth lens group G5, and has a bearing section 56a, a whirl stop section 56b, a rack supporting section 56c and a protrusion 56d. The guide pole 65b is inserted into the bearing section 56a, and the guide pole 65c is inserted into the whirl stop section 56b. The fifth lens group supporting frame 56 is supported movably in the Z axis direction in a state that its rotation about the optical axis AZ is regulated. The rack supporting section 56c supports a third rack 60 integrally, movably and rotatably in the Z axis direction. The protrusion 56d is a portion for detecting an original point of the fifth lens group G5, and is provided to a position where it can pass through a detection region of a third photosensor 68.

The third rack 60 has a plurality of teeth (not shown), and these teeth are geared with a lead screw 65a of the third focus motor 65. The sixth lens group supporting frame 57 supports the sixth lens group G6, and is fixed to the guide pole supporting frame 51.

The focus ring unit 88 has a focus ring 89, a focus ring angle detecting section 90 for detecting a rotation angle of the focus ring 89. The focus ring 89 has a cylindrical shape, and is supported rotatably about the optical axis AZ by the fixing frame 50 and the front frame 61 in a state its transfer in the Z axis direction is regulated. The rotation angle and the rotation direction of the focus ring 89 can be detected by the focus ring angle detecting section 90. For example, the focus ring angle detecting section 90 has two photosensors (not shown). The focus ring 89 has a plurality of protrusions 89a that is arranged at equal intervals in the rotation direction and protrudes to the Z axis direction. The respective photosensors have a light emitting section (not shown) and a light receiving section (not shown). The protrusions 89a pass between the light emitting section and the light receiving section so that the photosensors can detect the rotation angle and the rotation direction of the focus ring 89. The focus ring 89 may have another structure such as a movable lever.

The first focus regulating unit 72 has the first focus motor 63, a focus drive controller 41, and the first photosensor 66. The first focus motor 63 is on a side closer to an imaging surface than the diaphragm unit 62, and is fixed to the fixing frame 50. The first focus motor 63 drives the second lens group supporting frame 53 to the Z axis direction. The lead screw 63a of the first focus motor 63 rotates based on a drive signal input from the focus drive controller 41. Rotation generated by the first focus motor 63 is converted into a translatory movement of the second lens group supporting frame 53 to the Z axis direction by the lead screw 63a and the first rack 58, and the second lens group supporting frame 53 can transfer to the Z axis direction.

The second focus regulating unit 73 has the second focus motor 64, the focus drive controller 41 and the second photosensor 67. The second focus motor 64 is on a side closer to the imaging surface than the diaphragm unit 62, and is fixed to the fixing frame 50. The second focus motor 64 drives the fourth lens group supporting frame 55 to the Z axis direction. The lead screw 64a of the second focus motor 64 rotates based on a drive signal input from the focus drive controller 41. Rotation generated by the second focus motor 64 is converted into a translatory movement of the fourth lens group supporting frame 55 to the Z axis direction by the lead screw 64a and the second rack 59, so that the fourth lens group supporting frame 55 can transfer to the Z axis direction.

The third focus regulating unit 74 has the third focus motor 65, the focus drive controller 41 and the third photosensor 68. The third focus motor 65 is on a side closer to the imaging surface than the diaphragm unit 62, and is fixed to the guide pole supporting frame 51. The third focus motor 65 drives the fifth lens group supporting frame 56 to the Z axis direction. The lead screw 65a of the third focus motor 65 rotates based on a drive signal input from the focus drive controller 41. Rotation generated by the third focus motor 65 is converted into a translatory movement of the fifth lens group supporting frame 56 to the Z axis direction by the lead screw 65a and the third rack 60, so that the fifth lens group supporting frame 56 can transfer to the Z axis direction.

The focus drive controller 41 can control all the three focus motors 63, 64 and 65 simultaneously at different drive speeds, or can drive only any one or two of the focus motors.

When the focus lens groups G2, G4 and G5 are driven to a focus position, the three focus motors 63, 64 and 65 are simultaneously drive so that a speed of an AF operation can be heightened.

The diaphragm regulating unit 75 has the diaphragm unit 62, a diaphragm drive motor (not shown) for driving the diaphragm unit 62 and a diaphragm drive controller 42 for controlling the diaphragm drive motor. The diaphragm drive motor is, for example, a stepping motor. The diaphragm drive motor is driven based on a drive signal input from the diaphragm drive controller 42. A driving force generated by the diaphragm drive motor drives a diaphragm blade 62a to an open direction and a close direction so as to change an open shape. The diaphragm blade 62a is driven so that a aperture value of the optical system L can be changed.

The shake correcting unit 76 is a unit for repressing a shake of an optical image caused by movements of the interchangeable unit 2 and the camera body 3, and has an electromagnetic actuator 46, a position detecting sensor 47 and a shake correcting microcomputer 48.

The electromagnetic actuator 46 drives the third lens group supporting frame 54 to a direction perpendicular to the optical axis AZ. That is to say, the electromagnetic actuator 46 drives the third lens group G3 to the direction perpendicular to the optical axis AZ. The position detecting sensor 47 is a sensor for detecting the position of the third lens group supporting frame 54 with respect to the diaphragm unit 62. The interchangeable lens unit 2 is mounted with a movement detecting sensor (not shown) such as a gyro sensor. The shake correcting microcomputer 48 controls the electromagnetic actuator 46 based on a detected result of the position detecting sensor 47 and a detected result of the movement detecting sensor. As a result, a shake of a subject image caused by the movement of the digital camera 1 can be controlled.

As a method for repressing a shake of a subject image, en electronic shake correcting method for correcting a shake appearing on an image based on image data output from the imaging sensor 11 may be adopted. Further, as a method for repressing a shake of an optical image, a sensor shift method for driving the imaging sensor 11 to the two directions perpendicular to the optical axis AZ may be adopted.

The lens microcomputer 40 has a CPU (not shown), a ROM (not shown) and a memory 40a. A program stored in the ROM is loaded into the CPU so that various functions can be realized. For example, the lens microcomputer 40 can recognize that the second lens group supporting frame is on a position of the original point based on a detection signal of the first photosensor 66.

The memory 40a is a nonvolatile memory, and can retain information that is stored even in a state that a power supply is stopped. The memory 40a stores information about the interchangeable lens unit 2 (lens information), position information about the focus groups according to subject distances (information about tracking curves) and the like. The lens microcomputer 40 controls the focus motors 63, 64 and 65 based on the position information about the focus groups according to subject distances to drive the focus lens groups to the Z axis direction. The lens microcomputer 40 can obtain the positions of the focus lens groups G2, G4 and G5 in the direction of the optical axis AZ. That is to say, the lens microcomputer 40 can obtain subject distances. The subject distances are distances up to subjects whose optical images are focused by the optical system L. Concretely, the lens microcomputer 40 recognizes that the second lens group supporting frame 53 is in the position of the original point based on a detection signal of the first photosensor 66, and then counts a drive amount of the first focus motor 63 (for example, a number of steps) so as to obtain the position of the second lens group GP in direction of the optical axis AZ. Further, the lens microcomputer 40 recognizes that the fourth lens group supporting frame 55 is on the position of original position based on a detection signal of the second photosensor 67, and then counts a drive amount of the second focus motor 64 (for example, a number of steps) so as to obtain the position of the fourth lens group G4 in the direction of the optical axis AZ. Further, the lens microcomputer 40 recognizes that the fifth lens group supporting frame 56 is on the position of the original point based on a detection signal of the third photosensor 68, and then counts a drive amount of the third focus motor 65 (for example, a number of steps) so as to obtain a position of the fifth lens group G5 in the direction of the optical axis AZ.

1-3. Camera Body

A schematic configuration of the camera body 3 is described with reference to FIGS. 1 to 4. As shown in FIGS. 1 to 4, the camera body 3 has a chassis 3a, the body mount 4, an operating unit 39, an image obtaining section 35, an image display unit 36, a finder section 38, a body microcomputer 10 and a battery 22.

The chassis 3a composes an exterior section of the camera body 3. As shown in FIGS. 4A and 4B, the body mount 4 is provided to a front surface of the chassis 3a, and the operating unit 39 is provided to a rear surface and an upper surface of the chassis 3a. Concretely, a display unit 20, a power switch 25, a mode switching dial 26, a cross operation key 27, a menu setting button 28, a setting button 29, a mode switching button 34 and a moving image recording operation button 24 are provided to a rear surface of the chassis 3a. A shutter button 30 is provided to an upper surface of the chassis 3a.

The body mount 4 is a portion to which the lens mount 95 of the interchangeable lens unit 2 is attached and has a body side contact point (not shown) electrically connectable to the lens side contact point 91. The camera body 3 can send/receive data to/from the interchangeable lens unit 2 via the body mount 4 and the lens mount 95. For example, the body microcomputer 10 (described later) sends a control signal such as an exposure synchronizing signal to the lens microcomputer 40 via the body mount 4 and the lens mount 95.

As shown in FIGS. 4A and 4B, the operation unit 39 has various operation members for user's input of operation information. For example, the power switch 25 is a switch for turning on/off a power supply of the digital camera 1 or the camera body 3. When the power supply is brought into an ON state by the power switch 25, the camera body 3 and the interchangeable lens unit 2 supplies powers to the respective sections of the interchangeable lens unit 2.

The mode switching dial 26 is a dial for switching an operation mode among a still image recording mode, a moving image recording mode and a reproducing mode. The user rotates the mode switching dial 26 to be capable of switching the operation mode. When the still image recording mode is selected by the mode switching dial 26, the operation mode can be switched into the still image recording mode. When the moving image recording mode is selected by the mode switching dial 26, the operation mode can be switched into the moving image recording mode. The moving image recording mode basically enables the recording of moving images. Further, when the reproducing mode is selected by the mode switching dial 26, the operation mode can be switched into the reproducing mode, and captured images can be displayed on the display unit 20.

The cross operation key 27 is a button for enabling a user to select up, down, right and left directions. For example, a desired menu can be selected from various menu screens displayed on the display unit 20 by using the cross operation key 27.

The menu setting button 28 is a button for setting various operations of the digital camera 1. The setting button 29 is a button for determining execution of various menus.

The moving image recording operation button 24 is a button for instructing the start and stop of the recording of moving images. Even when the operation mode selected by the mode switching dial 26 is the still image recording mode or the reproducing mode, the operation mode shifts to the moving image recording mode forcibly regardless of contents set by means of the mode switching dial 26 and the recording of a moving image is started by pressing down the moving image recording operation button 24. Further, when the moving image recording operation button 24 is pressed down during the recording of a moving image, the recording of the moving image is completed, and the operation mode shifts to an operation mode selected by the mode switching dial 26, namely, the operation mode before the start of the recording of the moving image. For example, when the still image recording mode is selected by the mode switching dial 26 at the time of pressing the moving image recording operation button 24, after the moving image recording button 24 is again pressed down, the operation mode automatically shift to the still image recording mode.

The shutter button 30 is operated by the user at the time of shooting. When the shutter button 30 is operated, a timing signal is output to the body microcomputer 10. The shutter button 30 is a two-stage switch for enabling a half-press operation and a full-press operation. When the user performs the half-press operation, a photometric process and a distance measuring process starts. When the user fully presses the shutter button 30 in a state of the half-press of the shutter button 30, a timing signal is output, and the image obtaining section 35 obtains image data.

As shown in FIG. 2, a lens removing button 99 for removing the interchangeable lens unit 2 from the camera body 3 is provided to the front surface of the camera body 3. The lens removing button 99 has a contact point (not shown) that is in an ON state when the user presses down the lens removing button 99. The lens removing button 99 is electrically connected to the body microcomputer 10. When the lens removing button 99 is pressed down, the built-in contact point is turned ON, and the body microcomputer 10 can recognize that the lens removing button 99 is pressed down.

The image obtaining section 35 has an imaging sensor 11 such as a CCD (Charge Coupled Device) for making photoelectric conversion, a shutter unit 33 for regulating an exposure state of the imaging sensor 11, a shutter controller 31 for controlling drive of the shutter unit 33 based on a control signal from the body microcomputer 10, and an imaging sensor drive controller 12 for controlling the operation of an imaging sensor 11.

The imaging sensor 11 is, for example, a CCD (Charge Coupled Device) sensor for converting an optical image formed by the optical system L into an electric signal. The imaging sensor 11 is controlled to be driven by a timing signal generated from the imaging sensor drive controller 12. The imaging sensor 11 may be a CMOS (Complementary Metal Oxide Semiconductor) sensor.

The shutter controller 31 drives a shutter drive actuator 32 according to a control signal output from the body microcomputer 10 that has received the timing signal to operate the shutter unit 33.

In the first embodiment, a contrast detecting system that uses image data generated by the imaging sensor 11 is adopted as the autofocusing system. The use of the contrast detecting system can realize highly accurate focus regulation.

The body microcomputer 10 is a control device that controls a center of the camera body 3, and controls the respective sections of the digital camera 1 according to operation information input into the operation unit 39. Concretely, a CPU, a ROM and a RAM are mounted to the body microcomputer 10. Programs stored in the ROM are loaded into the CPU so that the body microcomputer 10 can realize various functions. For example, the body microcomputer 10 has a function for detecting attachment of the interchangeable lens 2 to the camera body 3, or a function for obtaining information necessary for controlling the digital camera 1, such as focus distance information, from the interchangeable lens unit 2.

The body microcomputer 10 can receive signals of the power switch 25, the shutter button 30, the mode switching dial 26, the cross operation key 27, the menu setting button 28 and the setting button 29. A memory 10a in the body microcomputer 10 stores various pieces of information about the camera body 3. The memory 10a is a nonvolatile memory, and can retain the stored information even in a state that the power supply is stopped.

Further, the body microcomputer 10 periodically generates a vertical synchronizing signal, and generates an exposure synchronizing signal based on the vertical synchronizing signal in parallel with the generation of the vertical synchronizing signal. Since the body microcomputer 10 recognizes exposure start timing and exposure end timing based on the vertical synchronizing signal in advance, it can generate the exposure synchronizing signal. The body microcomputer 10 outputs the vertical synchronizing signal to a timing generator (not shown), and outputs the exposure synchronizing signal to the lens microcomputer 40 via the body mount 4 and the lens mount 95 at a constant cycle. The lens microcomputer 40 obtains position information about the second lens group supporting frame 53, the fourth lens group supporting frame 55 and the fifth lens group supporting frame 56 in synchronization with the exposure synchronizing signal.

The imaging sensor drive controller 12 generates a reading signal of the imaging sensor 11 and an electronic shutter drive signal at a constant cycle based on the vertical synchronizing signal. The imaging sensor drive controller 12 drives the imaging sensor 11 based on the reading signal and the electronic shutter drive signal. That is to say, the imaging sensor 11 reads pixel data generated by a plurality of photoelectric converting devices (not shown) present in the imaging sensor 11 into a vertical transfer section (not shown) according to the reading signal.

Further, the body microcomputer 10 controls the focus regulating units 72, 73 and 74 via the lens microcomputer 40.

The image signal output from the imaging sensor 11 is sequentially sent from an analog signal processor 13 to an A/D converter 14, a digital signal processor 15, a buffer memory 16 and an image compressor 17 to be processed. The analog signal processor 13 executes an analog signal process such as a gamma process on the image signal output from the imaging sensor 11. The A/D converter 14 converts an analog signal output from the analog signal processor 13 into a digital signal. The digital signal processor 15 executes a digital signal process such as noise removal and contour enhancement on the image signal converted into the digital signal by the A/D converter 14. The buffer memory 16 is a RAM (Random Access Memory), and temporarily stores an image signal. The image signal stored in the buffer memory 16 is sequentially sent from the image compressor 17 to an image recording unit 18 and is processed. The image signal stored in the buffer memory 16 is read by a command of an image recording controller 19 and is sent to the image compressor 17. The data about the image signal sent to the image compressor 17 is compressed into an image signal according to a command of the image recording controller 19. The image signal has a data size smaller than that of the original data due to this compressing process. As the method for compressing an image signal, for example, a JPEG (Joint Photographic Experts Group) system for compressing each image signal of one frame is used. Thereafter, the compressed image signal is recorded in the image recording unit 18 by the image recording controller 19. When a moving image is recorded at this time, the JPEG system for compressing a plurality of image signals per frame can be used. Further, an H.264/AVC system for converting image signals of a plurality of frames collectively can be also used.

The image recording unit 18 relates the image signal to predetermined information to be recorded so as to create a still image file or a moving image file based on a command of the image recording controller 19. The image recording unit 18 records the still image file or the moving image file based on a command of the image recording controller 19. The image recording unit 18 is, for example, an internal memory and/or a removable memory to be detachable. The predetermined information to be recorded together with the image signal includes a date of recording of an image, focus distance information, shutter speed information, aperture value information and recording mode information. The still image file has, for example, an Exif (registered trade name) format or a format similar to the Exif format. Further, the moving image file has, for example, an H.264/AVC format or a format similar to the H.264/AVC format.

The image display unit 36 has the display unit 20 and the image display controller 21. The display unit 20 is, for example, a liquid crystal monitor. The display unit 20 displays the image signal recorded in the image recording unit 18 or the buffer memory 16 as a visible image based on a command from the image display controller 21. As a display format on the display unit 20, a display format for displaying only an image signal as a visible image and a display format for displaying an image signal and information at the time of shooting as a visible image are considered.

The finder section 38 has a liquid crystal finder 8 for displaying an image obtained by the imaging sensor 11, and a finder window 9 provided to the rear surface of the chassis 3a. The user peers through the finder window 9 to be capable of visually recognizing an image displayed on the liquid crystal finder 8.

The battery 22 supplies powers to the respective sections of the camera body 3, and further supplies a power to the interchangeable lens unit 2 via the lens mount 95. In the first embodiment, the battery 22 is a rechargeable battery. The battery 22 may be a dry cell or an external power supply for externally supplying a power through a power cord.

1-4. Correspondence Relationship with the Present Invention

The fourth lens group (main group focus lens) G4 is one example of a first focus lens. A configuration composed of the second lens group G2 and the fifth lens group G5 (sub group focus lenses) is one example of second focus lenses. The body microcomputer 10 is one example of a determining unit. The focus lens drive controller 41, the diaphragm drive controller 42 or the lens microcomputer 40 is one example of a control unit. A configuration composed of the main group focus lens G4, the sub group focus lenses G2 and G5, the focus lens drive controller 41, the lens microcomputer 40 and the body microcomputer 10 is one example of the focusing system. The digital camera 1 is one example of the image-capturing device.

In the following description, the configuration composed of the first focus lens, the second focus lens, the focus lens drive controller 41, the lens microcomputer 40 and the body microcomputer 10 is called the focusing system as the need arises.

2. Operation

An operation of the digital camera 1 according to the first embodiment is described below.

2-1. Recording mode

The digital camera 1 has two recording modes. Concretely, the digital camera 1 has "a finder recording mode" for enabling the recording while the user is observing a subject through the finder window 9, and "a monitor recording mode" for enabling the recording while the user observing a subject on the display unit 20.

In the finder recording mode, for example, the image display controller 21 drives the liquid crystal finder 8. As a result, an image of the subject obtained by the imaging sensor 11 (so-called a through image) is displayed on the liquid crystal finder 8.

In the monitor recording mode, for example, the image display controller 21 drives the display unit 20, so that real-time image of the subject is displayed on the display unit 20. The changeover between the two recording modes is carried out by the recording mode switching button 34.

2-2. Recording of Still Image

When the shutter button 30 is pressed fully by the user, a command is sent from the body microcomputer 10 to the lens microcomputer 40 to set the aperture value of the optical system L is set to an aperture value calculated based on an optical measured output from the imaging sensor 11. The lens microcomputer 40 controls the diaphragm drive controller 42 to control the diaphragm unit 62 to obtain the instructed aperture value. Simultaneously with the instruction of the aperture value, a drive command is sent from the imaging sensor drive controller 12 to the imaging sensor 11, and a drive command of the shutter unit 33 is sent. The imaging sensor 11 is exposed by the shutter unit 33 only for a time of the shutter speed calculated based on the optical measured output from the imaging sensor 11.

When an operation mode of the shake correcting unit 76 is ON, the shake correcting unit 76 performs a shake correcting operation, described later, at least while the imaging sensor 11 is being exposed.

The body microcomputer 10 executes a process for capturing an image, and when the capturing is completed, it sends a control signal to the image recording controller 19. The image recording unit 18 records the image signal in the internal memory and/or the removable memory based on a command from the image recording controller 19. The image recording unit 18 records information about the recording mode (whether the autofocus recording mode or the manual focus recording mode) as well as the image signal in the internal memory and/or the removable memory based on a command from the image recording controller 19.

Further, after the completion of the exposure, the imaging sensor drive controller 12 reads image data from the imaging sensor 11, and performs a predetermined image process. Then the image data is output to the image display controller 21 via the body microcomputer 10. As a result, an captured image is displayed on the display unit 20.

Further, after the completion of the exposure, the body microcomputer 10 resets the shutter unit 33 to an initial position. Further, the body microcomputer 10 provides a command for resetting the diaphragm unit 62 to the open position to the diaphragm drive controller 42 in the lens microcomputer 40, and the lens microcomputer 40 provides a reset command to the respective units. After the completion of the resetting, the lens microcomputer 40 informs the body microcomputer 10 of the completion of the resetting. After reception of information about the reset completion from the lens microcomputer 40 and after completion of a series of the process after the exposure, the body microcomputer 10 checks that the shutter button 30 is not pressed down, and ends a recording sequence.

2-3. Recording of Moving Image

The digital camera 1 also has a function for recording moving images. In the moving image recording mode, the imaging sensor 11 generates image data at a constant cycle, and continuously carries out autofocus according to the contrast detecting system using the generated image data. In the moving image recording mode, when the shutter button 30 is pressed down or the moving image recording operation button 24 is pressed down, a moving image is recorded in the image recording unit 18. Thereafter, when the shutter button 30 or the moving image recording operation button 24 is again pressed down, the recording of the moving image is stopped.

When the operation mode of the shake correcting unit 76 is ON, the shake correcting unit 76 performs a shake correcting operation (described later) at least while a moving image is being recorded.

2-4. Shake Correcting Operation

A shake to be added to the digital camera 1 is detected by a shake detecting section. The shake detecting section has a first angular velocity sensor for detecting a shake in a pitching direction (Y direction) and a second angular velocity sensor for detecting a shake in a yawing direction (X direction). A shake correcting microcomputer 48 performs time integration to output signals obtained from the first angular velocity sensor and the second angular velocity sensor, and converts it into shake angle information about the pitching direction and the yawing direction of the digital camera 1. The shake correcting microcomputer 48 calculates target position information about the third lens group G3 for returning the transfer of an optical image on the imaging surface caused by the shake of the digital camera 1 to its original position based on the shake angle information. In order to transfer the third lens group G3 according to the target position information, the shake correcting microcomputer 48 computes a difference between the target position information and current position information of the third lens group G3 detected by the position detecting sensor 47, and sends a signal to a pitch actuator (not shown) and/or a yoke actuator (not shown).

The pitch actuator and/or the yoke actuator drive the third lens group G3 based on this signal. In such a manner, the shake of a subject image caused by the shake of the digital camera 1 is corrected.

2-5. Autofocus Operation

The autofocus operation of the digital camera 1 according to the first embodiment is described below with reference to the drawings.

FIG. 11 is a diagram illustrating a lens positional relationship between the fourth lens group (hereinafter, "main group focus lens") G4 and the second and fifth lens groups (hereinafter, "sub group focus lenses") G2 and G5 of the digital camera 1. The position of the sub group focus lense G2 or G5 with respect to the position of the main group focus lens G4 is a "tracking position". When the respective lenses are on the tracking positions, the most suitable optical performance and image quality can be obtained. Further, to shift position of each of the sub group focus lenses G2 and G5 according to the tracking position corresponding to the position of the main group focus lens G4 is "tracking drive".

In the autofocus mode, when the user operates the shutter button 30, the respective focus lens groups G4, G2 and G5 transfer so as to be focused on a subject. In this embodiment, the autofocus detection is carried out by a hill climbing system using a captured image.

In the hill climbing system using the captured image, a contrast value (evaluation value) is calculated based on the captured image, and the contrast value is evaluated so that a focus position (or a focus position candidate) is detected. To drive the main group focus lens for detecting the focus position is "scan drive". In the scan drive, the main group focus lens is driven at a constant speed. The reason for driving at the constant speed is to obtain the contrast value on lens positions at equal intervals to improve detection accuracy of the focus position in the hill climbing system. Further, this is to simplify the lens control. At this time, in a conventional technique, the sub group focus lenses are driven by the tracking drive according to the drive of the main group focus lens.

Figure 12A:
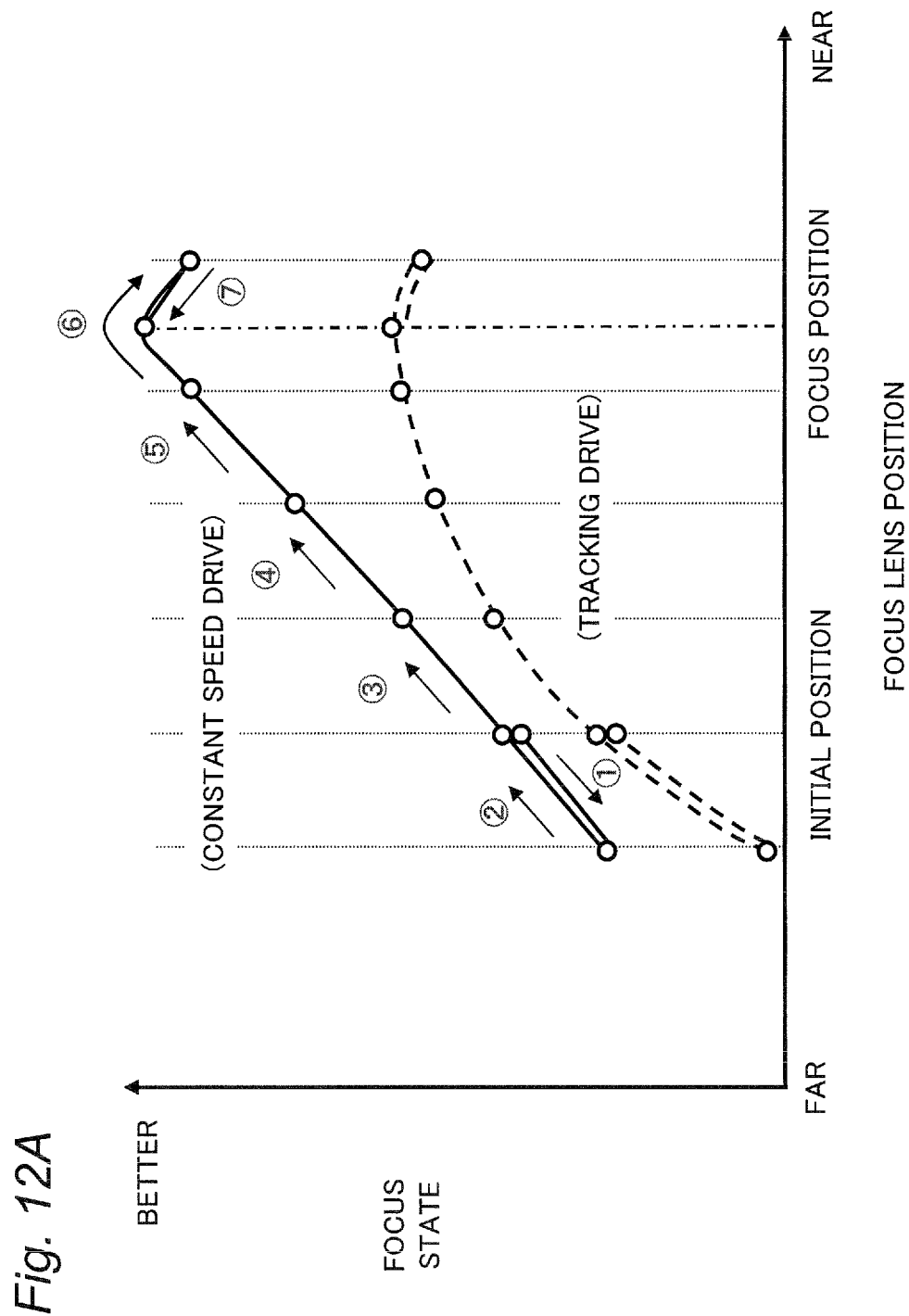
FIG. 12A is an explanatory diagram illustrating focus detection in a hill climbing system (tracking drive).

FIG. 12A is a diagram describing a movement of the sub group focus lenses in the autofocus operation according to the hill climbing system when performing tracking drive on the lenses. FIG. 12B is a diagram describing the lens positions that temporarily changes according to the operation shown in FIG. 12A. As shown by a straight line in FIG. 12B, the main group focus lens is driven at the constant speed, and the sub group focus lenses are driven by the tracking drive according to the drive of the main group focus lens as shown by a broken line of FIG. 12B. Concretely, the positions of the sub group focus lenses (tracking positions) are obtained according to a tracking curve at every predetermined control zone, and the sub group focus lenses are driven to the respective tracking positions. That is to say, in the conventional technique, since the sub group focus lenses are not driven at a constant speed as shown by the broken line of FIG. 12B, noises are generated and tones change at the time of a change in the speed, thereby deteriorating the sound quality. Further, when the drive speed matches with a resonance speed, the noises become more loud occasionally.

Conventional cameras focused on still images, and thus noises caused by the lens drive was not really acknowledged as a problem. However, cameras that focus on moving images and enable the autofocus during the recording of moving images have been developed recently, and thus a deterioration in the sound quality due to the noises becomes a problem. In order to avoid such a problem, a method for prohibiting the autofocus during the recording of moving images may be considered, but this method cannot sufficiently fulfill users' requirements.

The autofocus operation of the digital camera 1 according to the first embodiment that solves the above sound problem is described below. FIG. 13 is a diagram describing the movements of the main group focus lens G4 and the sub group focus lenses G2 and G5 in the focus operation of the digital camera 1 according to the first embodiment. In this drawing, a solid line shows the movement of the main group focus lens, and a broken line shows the movement of the sub group focus lenses.

In the scan drive by the main group focus lens G4, it is sufficient only to detect whether the focus position is on a Far side or a Near side until a peak (focus position) is detected. That is to say, in the scan drive, it is sufficient only to detect a direction of the focus position of the optical system with respect to a current position of the main group focus lens G4, and the detection accuracy does not have to be high. Therefore, in the scan drive according to the first embodiment, as shown in FIG. 13, the focus lens drive controller 41 prevents the sub group focus lenses G2 and G5 from being driven by the tracking drive with respect to the main group focus lens G4. Hereinafter, such drive is called "silent drive". The silent drive of the sub group focus lenses G2 and G5 is concretely to drive at constant-speed. The constant speed is a drive speed at which the most silent drive is enabled in view of a focus lens unit movable together with an actuator, and is set to a speed avoiding a resonance drive speed. In order to further improve the silence ability and the sound quality, the focus lens drive controller 41 may drive the sub group focus lenses G2 and G5 by means of acceleration and deceleration speed control. For example, when the main group focus lens G4 is moved towards the focus position, the sub group focus lenses G2 and G5 are accelerated smoothly at start of the drive and then driven at the constant speed. The speed may be reduced just before stop.

In the above scan drive, when the sub group focus lenses are driven at the constant speed, noises and the change in tone caused by switching of the speed can be reduced, thereby preventing the deterioration in the quality of recorded sounds while suppressing sound (noise) generation.

In an example of FIG. 13, rescan (after the peak of the evaluation value is detected, the peak is detected again) is not carried out, but the rescan can be carried out in order to increase the detection accuracy. For example, when the focus position (the peak of a mountain) cannot be detected, the detection accuracy is reduced and the scan speed is heightened so that the approximate focus position (the peak of the mountain) is detected. Thereafter, if the focus position can be approximately detected, the focus accuracy can be improved by the rescan with the speed being lowered.

During the rescan, in order to further improve the detection accuracy, the sub group focus lenses G2 and G5 may be driven by the tracking drive. That is to say, when the rescan drive is carried out after the scan drive, the sub group focus lenses G2 and G5 may be driven in the tracking drive with respect to the main group focus lens G4. At this time, when a difference between the current positions of the sub group focus lenses G2 and G5 and the tracking positions of the sub group focus lenses G2 and G5 with respect to the position of the main group focus lens G4 is not less than a predetermined value (influences the detection accuracy), the rescan drive does not have to be carried out until the sub group focus lenses G2 and G5 transfer to the tracking positions. Further, when the difference is not more than the predetermined value, the rescan drive may be immediately carried out.

The predetermined value varies according to the recording mode, the set aperture value and the image quality, and is calculated according to a recording state. For example, when the still image recording mode, when the open (small) aperture value is set, or when the high quality is set, the focus position should be detected accurately, and thus the predetermined value is preferably set to a smaller value. On the other hand, when the moving image recording mode, the large aperture value and the low image quality are set, the high-accurate detection of the focus position does not have to be carried out, and the focusing speed is given priority. For this reason, the predetermined value is preferably set to a larger value. That is to say, the predetermined value is set so that the value set at the time of selecting the still image recording mode is smaller than the predetermined value set at the time of selecting the moving image recording mode. Further, the predetermined value is set to a larger value as the diaphragm is changed from the open state to the narrowed state. Similarly, the predetermined value is set to a larger value as an image quality level is changed from the high quality to low quality. As a result, an optimum focusing performance can be realized according to the recording state.

Second Embodiment

Another example of the autofocus operation of the digital camera 1 is described with reference to FIG. 14. Since the configuration of the digital camera according to a second embodiment is similar to that in the first embodiment, the same reference signs are given and the description thereof is omitted.

Figure 14:
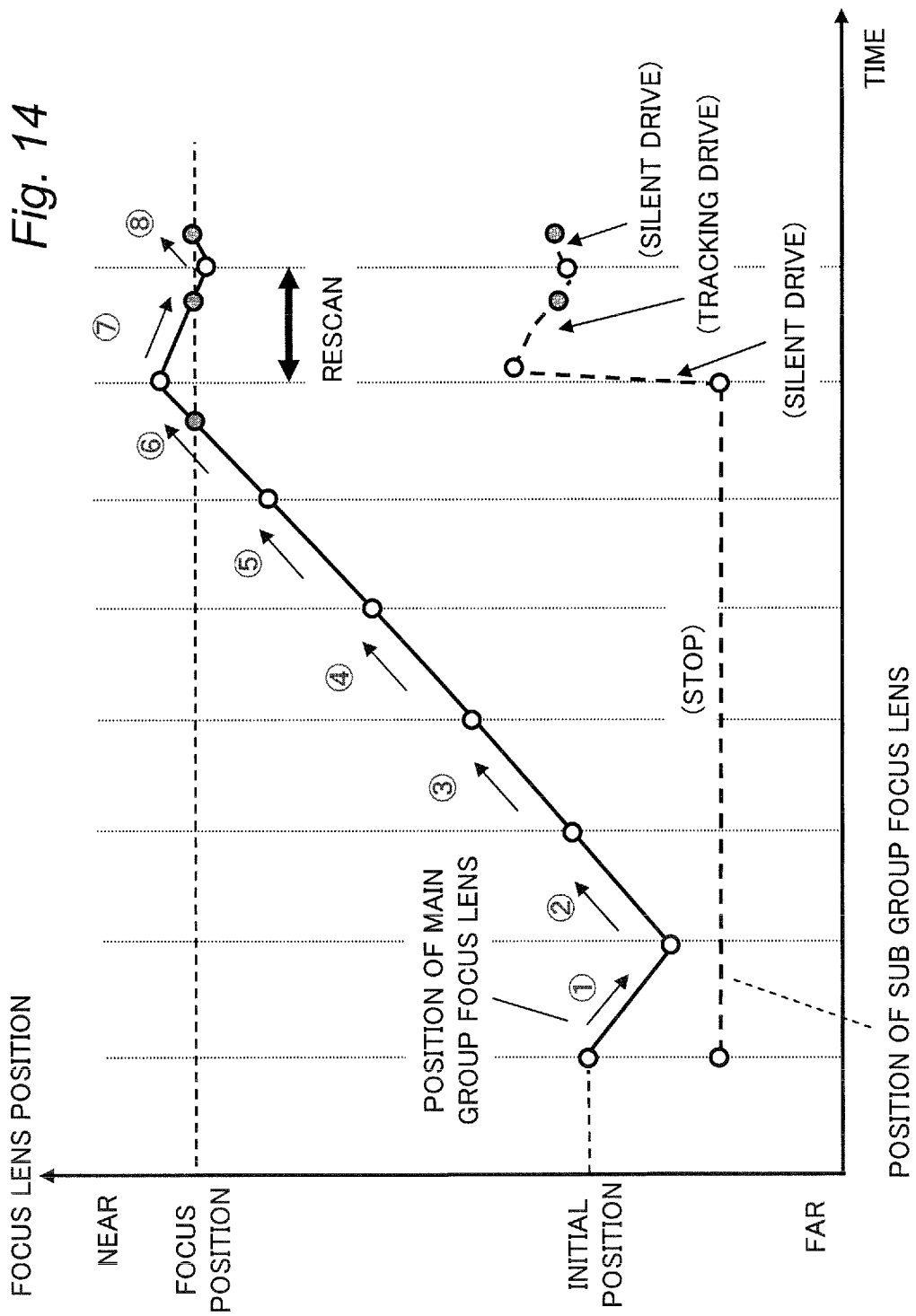
FIG. 14 is an explanatory diagram illustrating the focus detection driving method in the hill climbing system according to a second embodiment.

In FIG. 14, a solid line shows the movement of the main group focus lens, and a broken line shows the movement of the sub group focus lens. In the second embodiment, the focus lens drive controller 41 does not start a drive of the sub group focus lenses G2 and G5, namely, keeps them stop, until candidates of the focus positions are found by the drive of the main-group focus lens G4. As a result, the noises in the entire focusing system are further reduced, and simultaneously the power consumption can be reduced.

Figure 19:
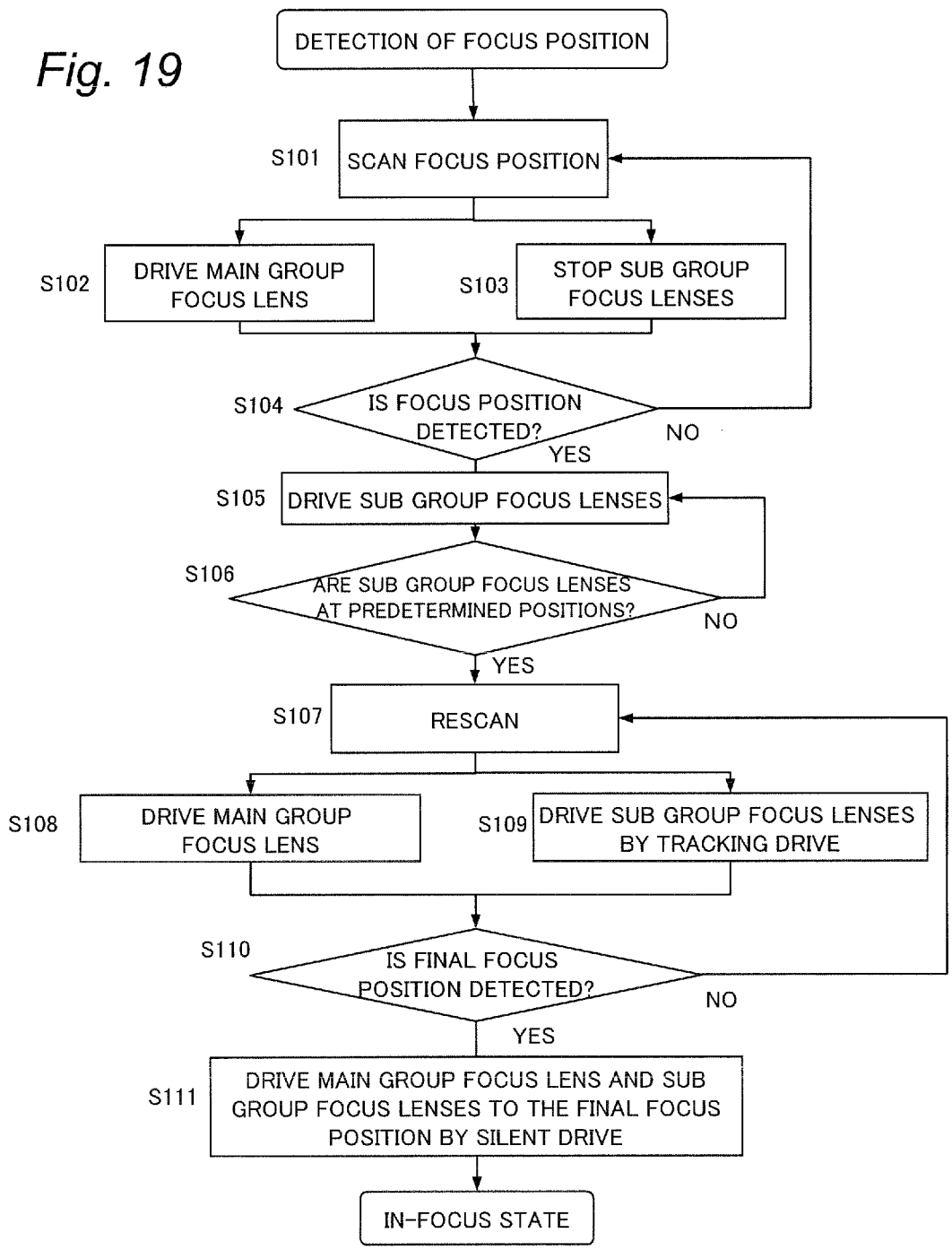
FIG. 19 is a flowchart illustrating the focus detection driving method in the hill climbing system according to the second embodiment.

FIG. 19 is a flowchart illustrating focus detection drive according to the hill climbing system in the second embodiment. When the detection of the focus position by the body microcomputer 10 is started, the focus lens drive controller 41 starts scanning of the focus position by the main group focus lens G4 (S101, S102). At this time, the focus lens drive controller 41 makes a control to stop the sub group focus lenses G2 and G5 (S103).

The body microcomputer 10 monitors a change in the focus state of a subject image according to the scanning of the focus position by the main group focus lens G4. That is to say, the focus lens drive controller 41 repeats this process (S101 to S103) until the body microcomputer 10 detects the peak of a change in the focus state (S104).

When the body microcomputer 10 detects the peak (focus position) of the change in the focus state (S104), the focus lens drive controller 41 drives the sub group focus lenses G2 and G5 to predetermined positions corresponding to the focus position of the main-group focus lens G4 (S105, S106).

When the sub group focus lenses G2 and G5 transfer to the predetermined positions (S106), the rescan drive is carried out (S107). During the rescan drive, the main group focus lens G4 is driven and the sub group focus lenses G2 and G5 are driven by the tracking drive with respect to the main group focus lens G4 (S108, S109). At this time, when the difference between the current positions of the sub group focus lenses G2 and G5 and their tracking positions with respect to the main group focus lens is a predetermined or more value (the detection accuracy is influenced), the rescan drive may be stopped until the sub group focus lenses G2 and G5 are driven to the tracking positions. Further, when the difference is the predetermined or less value, the rescan drive may be immediately carried out. Since the details of the predetermined value are similar to those in the first embodiment, the description thereof is omitted.

Also at the time of the rescan, the control may be made so that the sub group focus lenses G2 and G5 stop. In this case, the true focus position can be obtained by correcting the focus position calculated based on the contrast value of an captured image, based on the positional relationship between the sub group focus lenses and the main group focus lens (see FIG. 11) with reference to the tracking lens data.

Further, when drive to the focus position is carried out after the final focus position is detected (S110), the silent drive is carried out without tracking drive of the sub group focus lenses G2 and G5 with respect to the main group focus lens G4 (S111).

In the digital camera 1 according to the second embodiment, a noise and a tone change caused at the time of switching the speed do not occur, and suppression of sound and the quality of recorded sounds can be improved.

In the above flow, although the rescan (S107) is carried out, the rescan does not have to be carried out.

Third Embodiment

A third embodiment describes the focus operation by moving slightly forward and backward (wobbling) the lens along the optical axis of the main group focus lens. Since the configuration of the digital camera 1 according to the third embodiment is similar to that of the digital camera 1 according to the first embodiment, the same reference signs are given and the description thereof is omitted.

Figure 15:
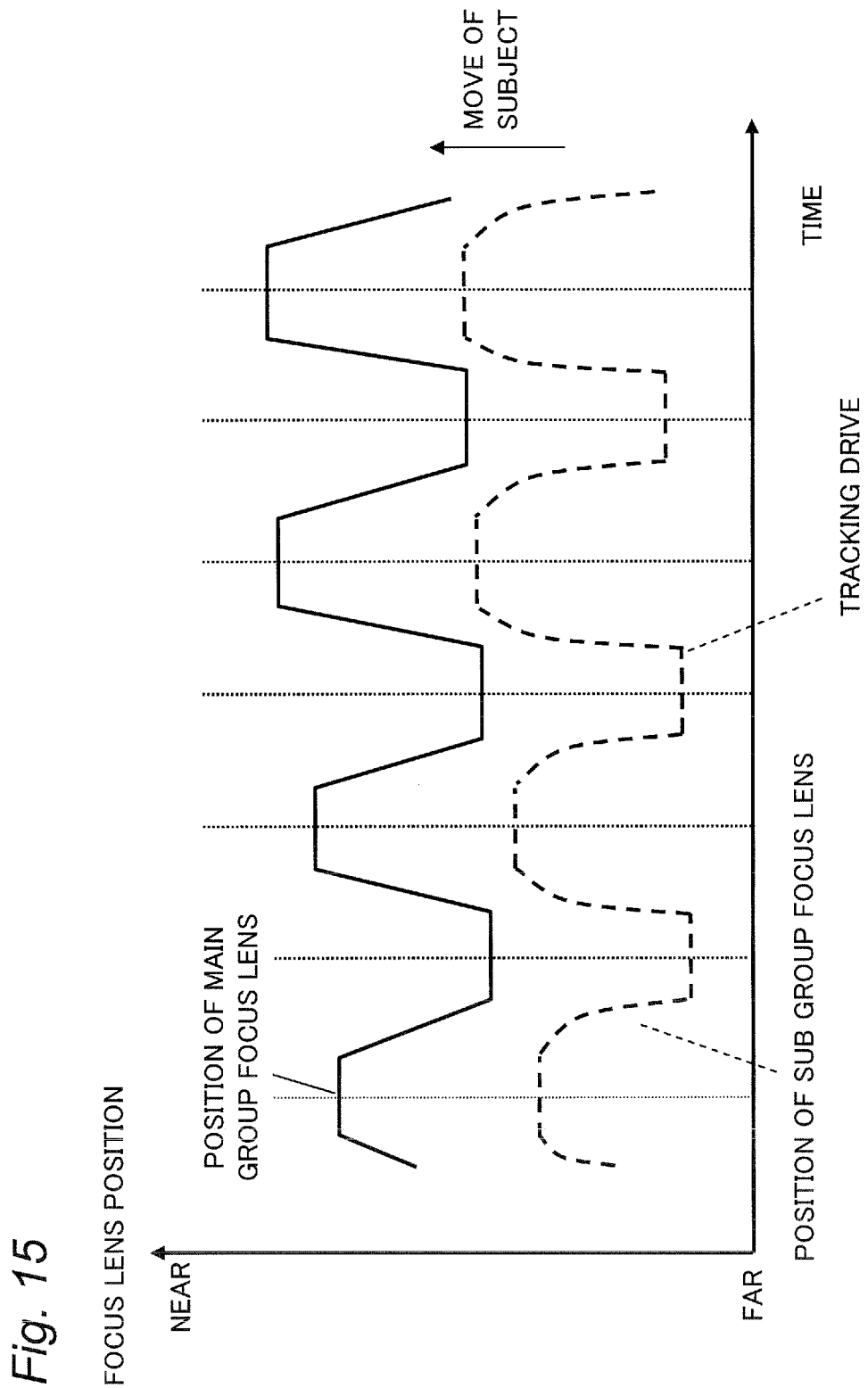
FIG. 15 is an explanatory diagram illustrating the focus detection in a wobbling operation (tracking drive).

The wobbling is a drive method for driving to move slightly forward and backward the focus lenses in order to set the in-focus state, and this can ensure the in-focus state immediately when a subject transfers. Concretely, the focus lenses are moved forward and backward along the optical axis from the current lens positions, and directions of the focus positions (the focus position changes according to the transfer of the subject) are detected based on an image captured on the respective positions. Then the focus lenses are moved to the detected directions. This operation is continuously repeated so that the focus lenses can be always controlled to positions close to the focus positions. For this reason, the in-focus state can be quickly obtained for the transferring subject. The wobbling is called also as full-autofocus. The wobbling enables the focusing without user's half-pressing of the shutter button, and thus the in-focus state on the subject can be always maintained. This technique is effective particularly at the time of capturing moving images and is employed in many video cameras. FIG. 15 is a diagram describing the movements of the sub group focus lenses driven by the tracking drive with respect to the main group focus lens when the main group focus lens is driven to be wobbled. In the drawing, a solid line shows the movement of the main group focus lens, and a broken line shows the movements of the sub group focus lenses driven by the tracking drive with respect to the main group focus lens. The wobbling drive is conducted by the lens microcomputer 40 controlling the focus lens drive controller 41 based on a control signal received from the body microcomputer 10.

In the wobbling, the lens should be always moved slightly forward and backward. For this reason, in the wobbling drive of the focusing system composed of a plurality of focus lens groups such as this system, when the sub group focus lenses are driven in the tracking drive with respect to the main group focus lens, noises and power consumption increase. A drive method for solving this problem at the time of the wobbling drive is described below.

Figure 16:
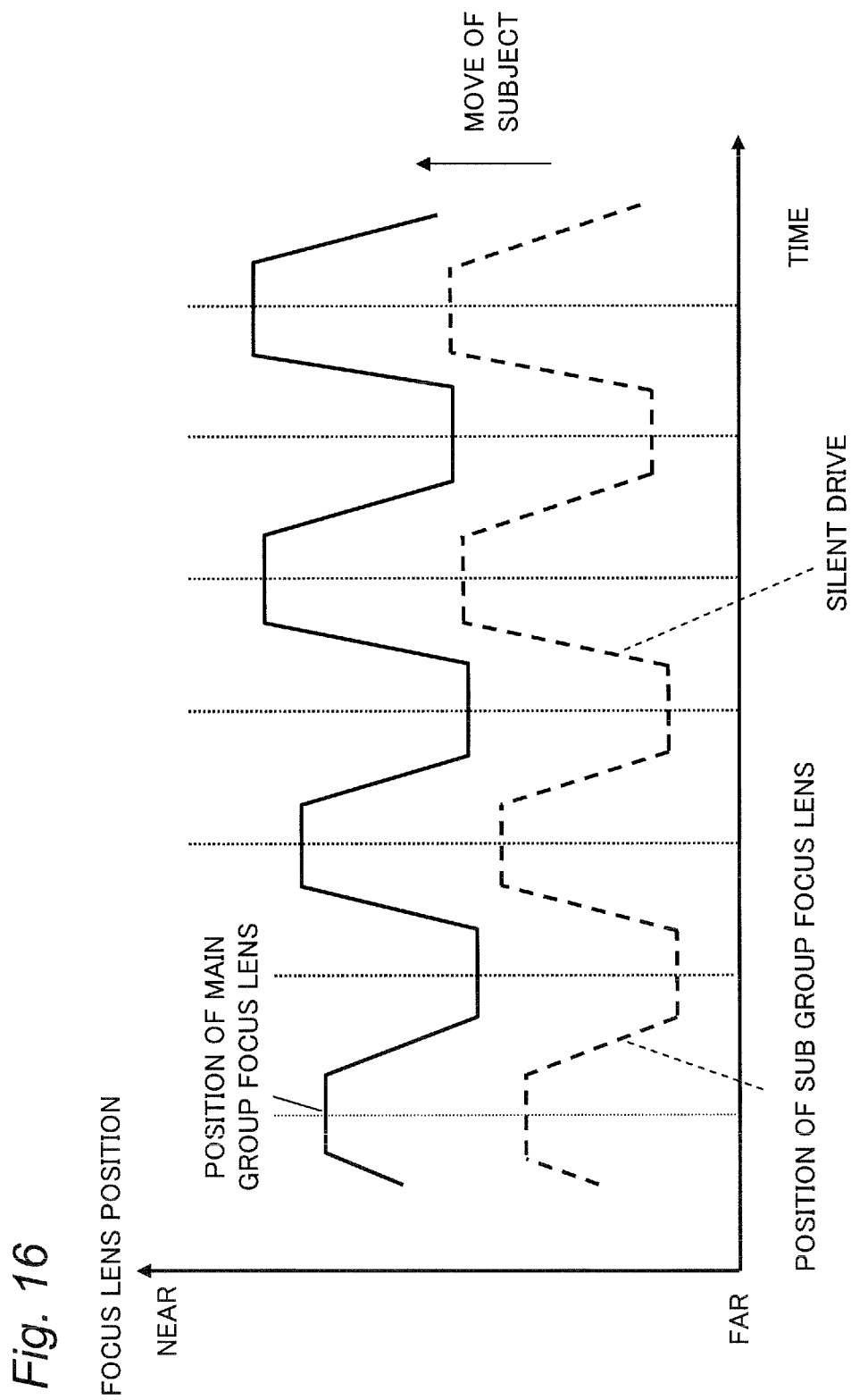
FIG. 16 is an explanatory diagram illustrating the focus detection driving method using the wobbling according to a third embodiment.

FIG. 16 is a diagram describing the movements of the focus lenses when the main group focus lens and the sub group focus lenses are driven to be wobbled by the control in the third embodiment. In the drawing, a solid line shows the movement of the main group focus lens and a broken line shows movement of the sub group focus lenses. As shown in FIG. 16, at the time of the wobbling, the focus lens drive controller 41 does not perform the tracking drive for the sub group focus lenses G2 and G5 with respect to the main group focus lens G4, but performs the silent drive for the lenses G2 and G5. That is to say, the focus lens drive controller 41 drives the sub group focus lenses G2 and G5 at the constant speed according to a drive state of the main group focus lens G4. That is to say, the sub group focus lenses G2 and G5 transfer without following the tracking curve. The constant speed is set to a drive speed which is other than the resonance drive speed. In order to further improve the silent ability and sound quality, the focus lens drive controller 41 may drive the sub group focus lenses G2 and G5 by the accelerated and decelerated speed control.

With the above configuration, the digital camera 1 performs the silent drive to the sub group focus lenses G2 and G5 (drive at the constant speed) in the wobbling drive. For this reason, the generation of the noises and the change in the tone can be reduced, thereby improving silent ability and the quality of a recorded sound.

Fourth Embodiment

Another example of the wobbling drive that can reduce the generation of the noises and the change in the tone is described.

Figure 17:
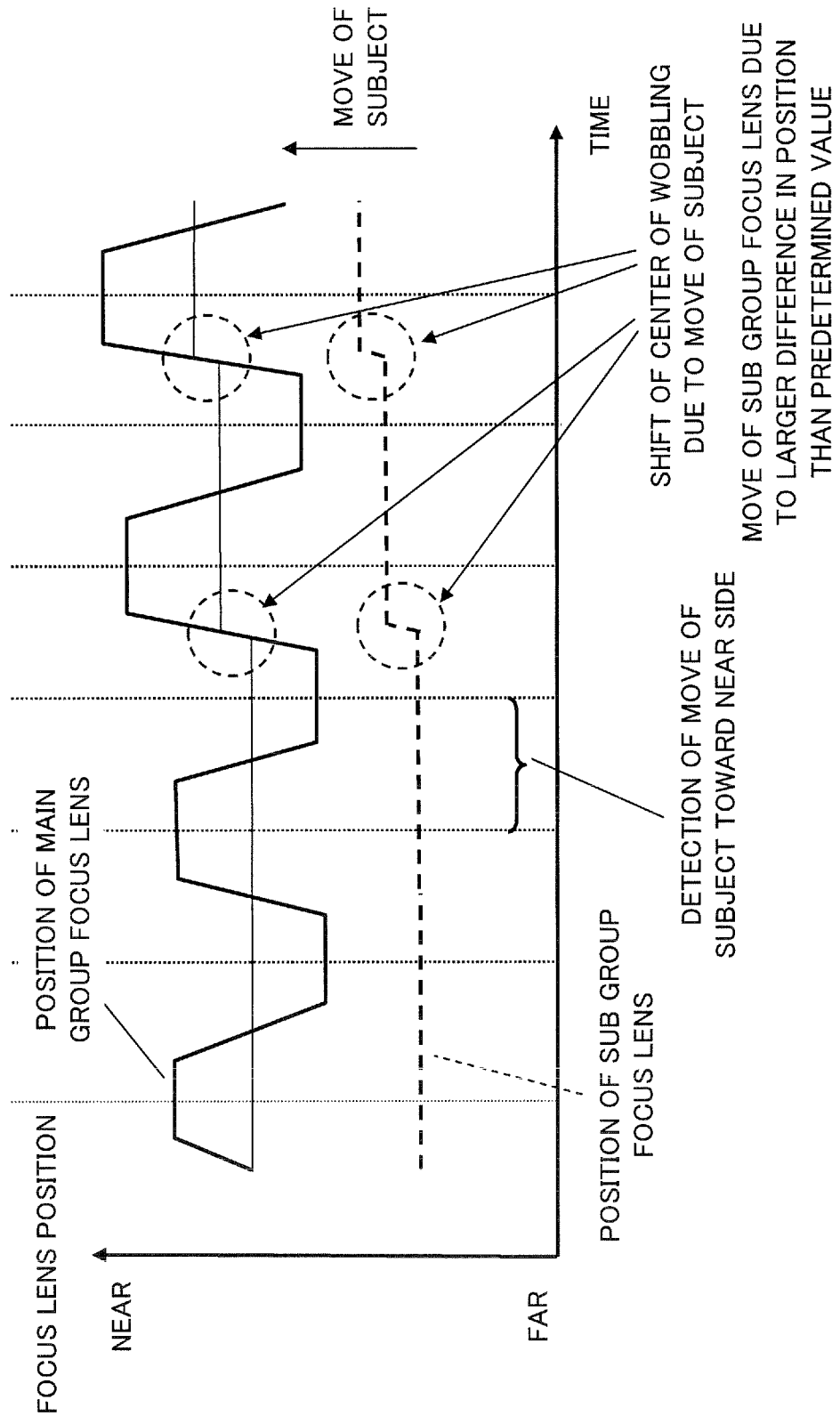
FIG. 17 is an explanatory diagram illustrating the focus detection driving method using the wobbling according to a fourth embodiment.

FIG. 17 is a diagram describing the wobbling drive according to the fourth embodiment. As shown in the drawing in the fourth embodiment, at the time of the wobbling, while the center position of the main group focus lens G4 does not shift (namely, a subject does not transfer), the sub group focus lenses G2 and G5 are stopped. When the center position of the main group focus lens G4 shifts, the sub group focus lenses G2 and G5 are transferred by the silent drive to the tracking positions corresponding to the center position of the main group focus lens in the wobbling. Since the configuration of the digital camera 1 according to the fourth embodiment is similar to the case in the first embodiment, the same reference signs are given and the description thereof is omitted.

Only when the center position of the wobbling (the center position of drive of moving slightly forward and backward) changes due to the transfer of a subject, the focus lens drive controller 41 drives the sub group focus lenses G2 and G5 in the noise reduction state, thereby realizing the noise reduction and reducing the power consumption.

Figure 20:
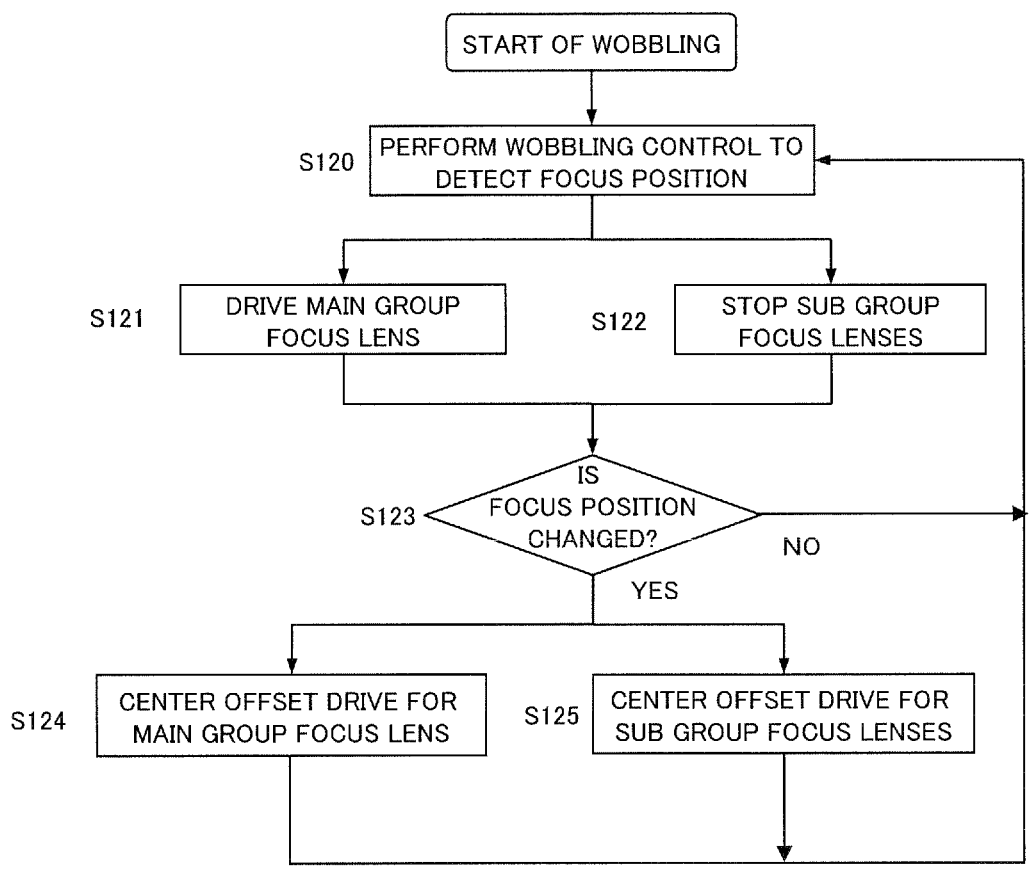
FIG. 20 is a flowchart illustrating the focus detection driving method using the wobbling according to the fourth embodiment.

FIG. 20 is a flowchart illustrating a focus detecting process at the time of the wobbling drive in the fourth embodiment.

When the detection of the focus position is started by the body microcomputer 10, the focus lens drive controller 41 starts the wobbling of the focus lens (S120). At this time, the focus lens drive controller 41 makes a control so as to drive the main group focus lens G4 (S121) and stop the sub group focus lenses G2 and G5 (S122).

When the body microcomputer 10 detects a change in the center position (the focus position) of the wobbling due to the transfer of the subject (S123), the focus lens drive controller 41 drives the main group focus lens G4 to shift the center position of the wobbling (S124). Further, the focus lens drive controller 41 drives the sub group focus lenses G2 and G5 to move to the tracking position corresponding to the center position of the main group focus lens G4 (S125). That is to say, the main group focus lens G4 is transferred to a direction of the focus position, and the positions of the sub group focus lenses G2 and G5 are changed according to a shift of the center position of the main group focus lens G4.

Figure 18:
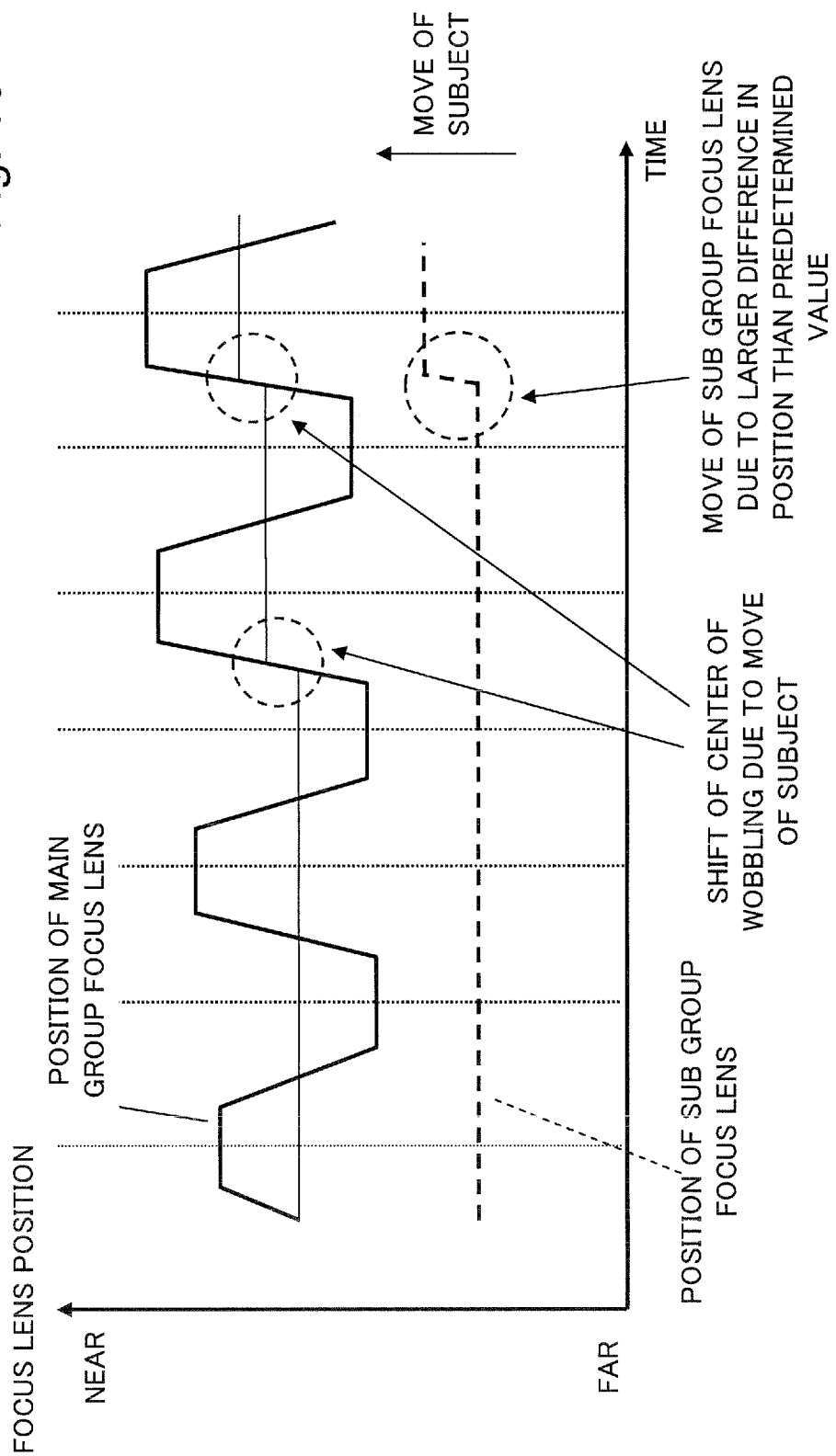
FIG. 18 is an explanatory diagram illustrating the focus detection driving method using the wobbling according to the fourth embodiment.

At the time of the wobbling drive, only when the center position of the main group focus lens G4 shifts and the difference between the positions of the sub group focus lenses G2 and G5 and the tracking positions of the sub group focus lenses G2 and G5 with respect to the position of the main group focus lens G4 is the predetermined or more value, the sub group focus lenses G2 and G5 may be transferred to the tracking positions corresponding to the center position of the wobbling by the silent drive (see FIG. 18). The predetermined value varies according to the recording mode, the set diaphragm and the image quality similarly to the first embodiment, and is set to a value calculated according to the recording state. That is to say, only when it is determined that the image quality and the detection accuracy of the focus position are deteriorated if the sub group focus lenses G2 and G5 are not transferred, the focus lens drive controller 41 may drive the sub group focus lenses G2 and G5.

With the above configuration, the digital camera 1 according to the fourth embodiment can reduce the noises and the change in the tone and can improve the noise reduction and the quality of recorded sounds.

Fifth Embodiment

In the second embodiment, the sub group focus lenses G2 and G5 are stopped until the peak (focus position) of the change in the focus state is detected, and when the peak (focus position) of the change in the focus state is detected, the sub group focus lenses G2 and G5 are driven. On the contrary, in a fifth embodiment, only when the difference between the tracking positions of the sub group focus lenses G2 and G5 with respect to the current position of the main group focus lens G4 and the current positions of the sub group focus lenses G2 and G5 is the predetermined or more value, the silent drive of the sub group focus lenses G2 and G5 are started. The predetermined value is as described in the first embodiment.

Figure 21:
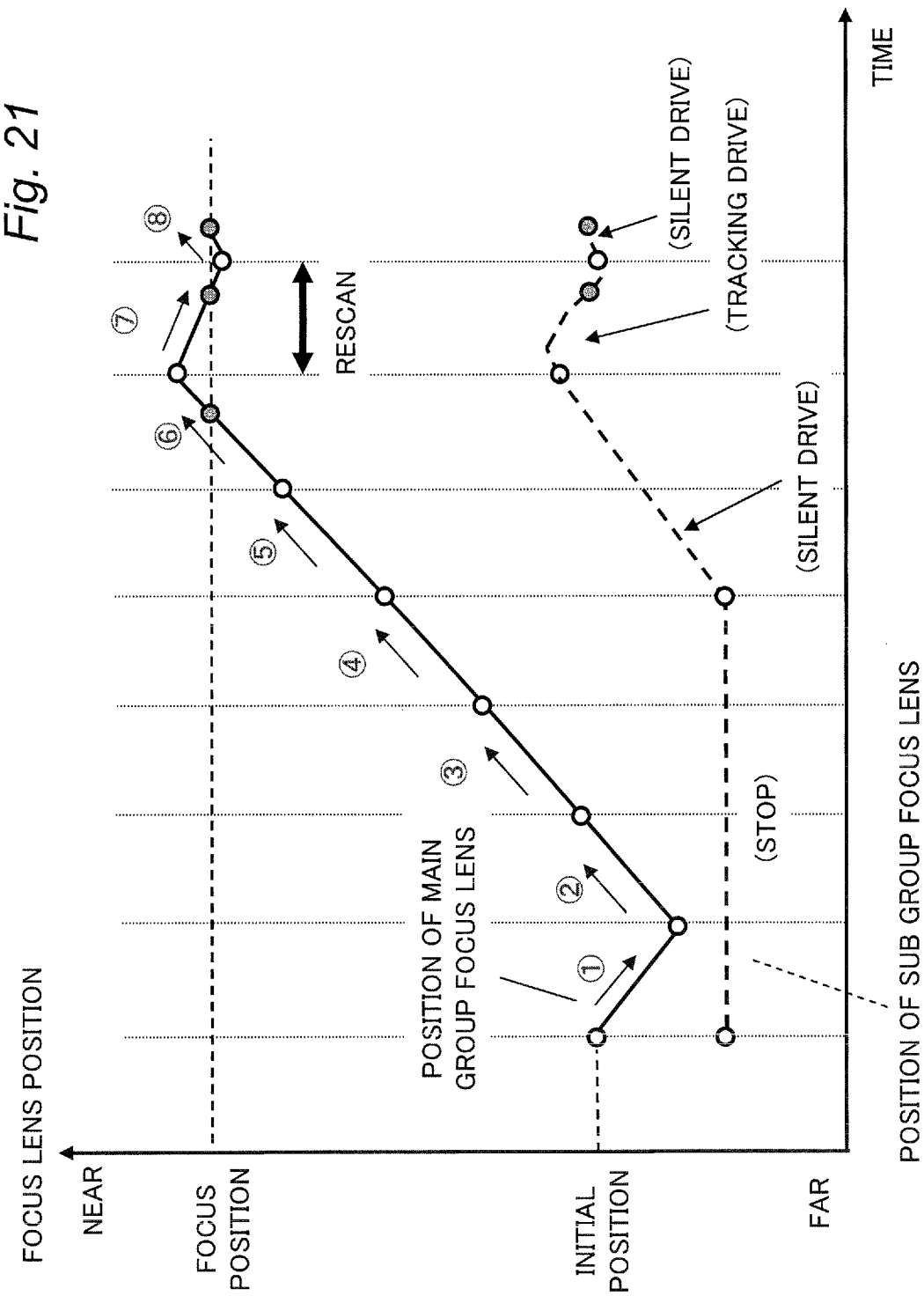
FIG. 21 is an explanatory diagram illustrating the focus detection driving method in the hill climbing system according to a fifth embodiment.

FIG. 21 is a diagram describing movements of the focus lenses in the fifth embodiment. In FIG. 21, a solid line shows the movement of the main group focus lens and a broken line shows the movement of the sub group focus lenses.

The focus operation of the digital camera 1 according to the fifth embodiment is described below with reference to the drawings. Since the configuration of the digital camera 1 according to the fifth embodiment is similar to the case in the first embodiment, the description thereof is omitted.

Figure 22:
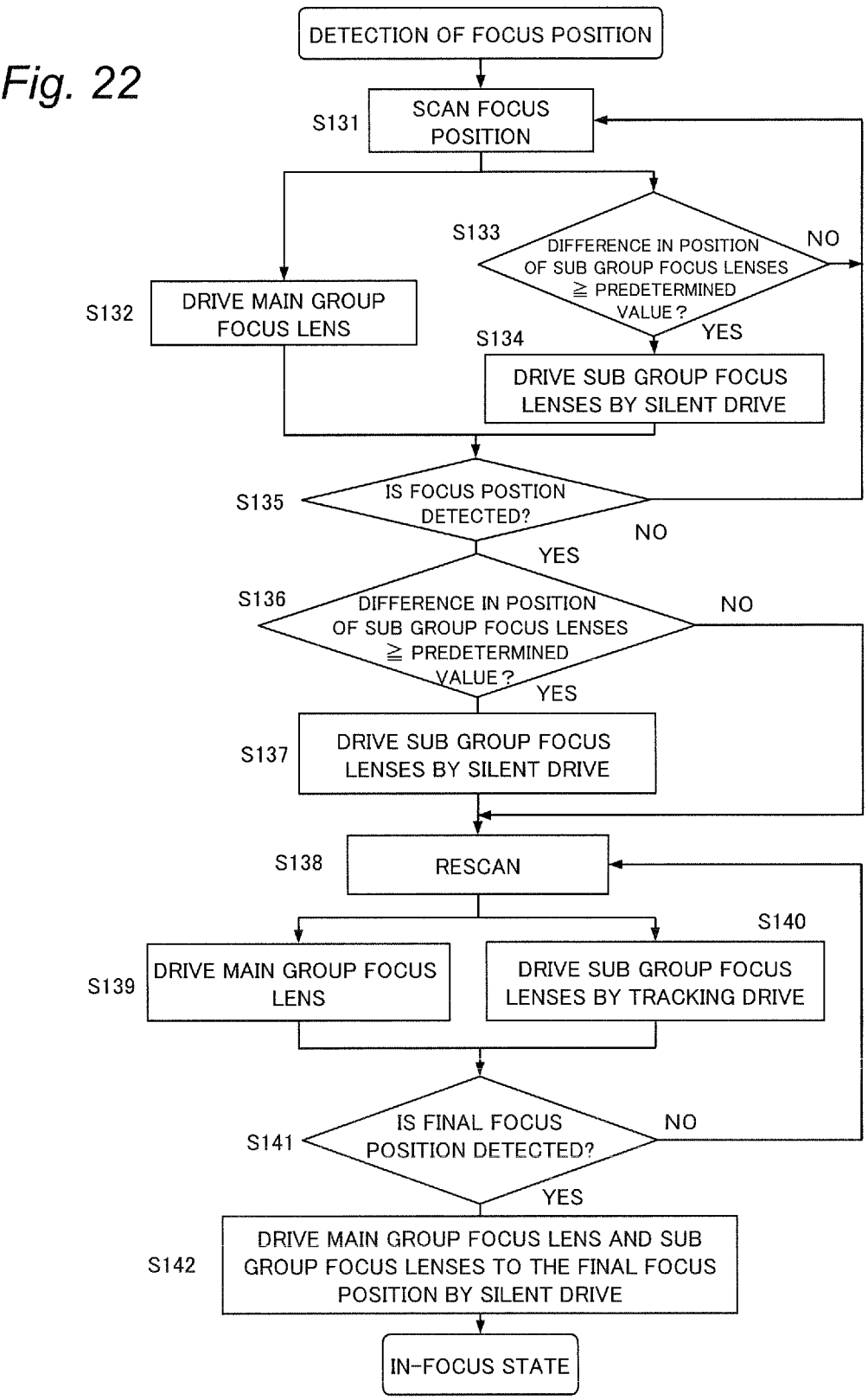
FIG. 22 is a flowchart illustrating the focus detection driving method in the hill climbing system according to the fifth embodiment.

FIG. 22 is a flowchart illustrating a focus detection driving method according to the hill climbing system according to the fifth embodiment. When the detection of the focus position is started by the body microcomputer 10, the focus lens drive controller 41 starts to scan the focus position of the main group focus lens G4 (S131, S12). Further, the focus lens drive controller 41 makes a control to stop the sub group focus lenses G2 and G5. The focus lens drive controller 41 determines whether the difference between the current positions of the sub group focus lenses G2 and G5 and the tracking positions of the sub group focus lenses G2 and G5 with respect to the position of the main group focus lens is the predetermined or more value (S133).

When the difference is the predetermined or more value (S133), the focus lens drive controller 41 transfers the sub group focus lenses G2 and G5 to the tracking positions by the silent drive (S134). That is to say, the focus lens drive controller 41 drives the sub group focus lenses G2 and G5 at the constant speed. The constant speed is as described before. In order to further improve the noise reduction and the sound quality, the focus lens drive controller 41 may drive the sub group focus lenses G2 and G5 by the accelerated and decelerated speed control.

While scanning the focus position of the main group focus lens G4, the body microcomputer 10 monitors the change in the focus state of a subject image. The body microcomputer 10 repeats the operation flow from steps S131 to S134 until it detects the peak (focus position) of the change in the focus state (S135).

When the body microcomputer 10 detects the peak (namely, the focus position) of the change in the focus state (S135), it executes the following process.

The lens microcomputer 40 determines whether the difference between the current positions of the sub group focus lenses G2 and G5 and the tracking positions with respect to the position of the main group focus lens is a predetermined or more value (S136). When the lens microcomputer 40 determines that the difference is the predetermined or more value, the focus lens drive controller 41 transfers the sub group focus lenses G2 and G5 to the tracking positions by the silent drive (S137).

Thereafter, the focus lens drive controller 41 carries out rescan in order to recheck the focus position and improve the detection accuracy of the focus position (S138). In the rescan, the main group focus lens G4 is driven at a lower speed. Further, the focus lens drive controller 41 drives the sub group focus lenses G2 and G5 with respect to the main group focus lens G4 by the tracking drive (S140). The focus lens drive controller 41 repeats the process from steps S138 to S140 until the body microcomputer 10 detects the final focus position (S141).

When the final focus position is detected, the focus lens drive controller 41 transfers the main group focus lens G4 and the sub group focus lenses G2 and G5 to the final focus positions by the silent drive (S142).

With such an arrangement, the digital camera 1 according to the fifth embodiment can reduce the noises and the change in the tone and can improve the noise reduction and the quality of recorded sounds.

Other Embodiments

The present invention is not limited to the above embodiments and can be variously modified and changed without departing from the gist of the present invention. Further, the above embodiments are substantially preferable examples and do not intent to limit the scope of the present invention, its applications and usage thereof. That is to say, the concept in the above embodiments, namely, the control for the main group focus lens and the sub group focus lenses can be applied also to the following case.

(1) In the above embodiments, the digital camera can capture a still image and a moving image, but may be capable of capturing either one of still image and a moving image.

(2) In the above embodiments, the digital camera may be a digital still camera, a digital video camera, a mobile telephone with a camera, or a PDA with a camera.

(3) The digital camera 1 does not contain a quick return mirror, but may contain a quick return mirror like a conventional single-lens reflex camera.

(4) The configuration of the optical system L is not limited to those in the above embodiments. For example, the third lens group G3 may be composed of a plurality of lenses, or the sixth lens group G does not have to be provided.

(5) In the above embodiments, the operation of the shutter unit 33 controls the exposure time of the imaging sensor 11, but the exposure time of the imaging sensor 11 may be controlled by an electronic shutter.

(6) In the above embodiments, the three focus regulating units are provided, but any number (two or more) of units may be provided.

(7) The interchangeable lens unit 2 is a single-focus optical system, but it may be a zoom optical system that can change the focus distance.

(8) The first focus motor 63, the second focus motor 64 and the third focus motor 65 are not limited to a stepping motor, but it may be another actuator. For example, the actuator may be an electromagnetic motor, a voice coil motor, and a vibration actuator using a piezoelectric device, or the like.

(9) The wobbling drive waveform shown in FIGS. 15 to 18 is a trapezoidal waveform, but it may be a triangular waveform or a sine waveform. Further, the concept in the above embodiments are not limited only to the contrast autofocus in the hill climbing system, and similarly can be applied also to autofocus in a phase difference detecting system.

(10) In the above embodiments, the main group focus lens and the sub group focus lenses are set, but the concept in the embodiments is not limited to this. That is to say, dependency may not be provided in movement among a plurality of focus lens groups, and they may be driven independently.

(11) The focus lenses described in the above embodiments may be controlled only in the interchangeable lens 2. In this case, the function of the body microcomputer 10 relating to the control of the focus lenses described in the above embodiments may be realized in the interchangeable lens 2. For example, the lens microcomputer 40 may realize this function. Further, in the above embodiments, the digital camera 1 is an interchangeable lens type digital camera, but the concept in the above embodiments can be applied also to a digital camera (image-capturing device) where a lens and a camera body are integral with each other (namely, the lens is detachable).

(12) The drive control of the main group focus lens G4 and the sub group focus lenses G2 and G5 described in the above embodiments may be made in the interchangeable lens 2.

(13) The above embodiments also disclose the concept of a focusing system having the following configuration.

A) A focusing system containing an optical system including a first focus lens and a second focus lens, the optical system moving forward and backward along an optical axis to regulate a focus state of a subject image, the focusing system including:

a determining unit for periodically detecting the focus state of the subject image formed via the first focus lens and the second focus lens and comparing detected results to determine a focus position of the optical system;

a first drive control unit for controlling the first focus lens to move along the optical axis based on the determined result of the determining unit so that the subject image is set in an in-focus state;

a second drive control unit for controlling the second focus lens to move along the optical axis in order to assist regulation of the focus state of the subject image; and a control unit for controlling the second drive control unit to drive the second focus lens at a constant speed until the determining unit determines candidate of a focus position of the subject image.

B) A focusing system containing an optical system including a first focus lens and a second focus lens, the optical system moving forward and backward along an optical axis to regulate a focus state of a subject image, the focusing system including:

a determining unit for periodically determining the focus state of the subject image formed via the first focus lens and the second focus lens and comparing detected results to determine a focus position of the optical system;

a first drive control unit for controlling the first focus lens to move along the optical axis based on the determined result of the determining unit so that the subject image is set in an in-focus state;

a second drive control unit for controlling the second focus lens to move along the optical axis in order to assist regulation of the focus state of the subject image by the first focus lens; and a control unit for controlling the second drive control unit so that the second focus lens is not driven until the determining unit determines candidate of a focus position of the subject image.

C) A focusing system containing an optical system including a first focus lens and a second focus lens, the optical system moving forward and backward along an optical axis to regulate a focus state of a subject image, the focusing system including:

a determining unit for periodically detecting the focus state of the subject image formed via the first focus lens and the second focus lens and comparing detected results to determine a focus position of the optical system;

a first drive control unit for controlling the first focus lens to move along the optical axis based on the determined result of the determining unit so that the subject image is set in an in-focus state;

a second drive control unit for controlling the second focus lens to move along the optical axis in order to assist regulation of the focus state of the subject image by the first focus lens; and a control unit for controlling the second drive control unit to drive the second focus lens when a difference between a tracking position of the second focus lens with respect to a current position of the first focus lens and a current position of the second focus lens is a predetermined or more value.

D) A focusing system containing an optical system including a first focus lens and a second focus lens, the optical system moving forward and backward along an optical axis to regulate a focus state of a subject image, the focusing system including:

a determining unit for periodically detecting the focus state of the subject image formed via the first focus lens and the second focus lens and comparing detected results to determine a focus position of the optical system;

a first drive control unit for controlling the first focus lens to move slightly forward and backward along the optical axis for the determining unit determining a position where the subject image is in-focus;

a second drive control unit for controlling the second focus lens to move along the optical axis in order to assist regulation of the focus state of the subject image by the first focus lens; and a control unit for controlling the second drive control unit to drive the second focus lens at a constant speed when the first focus lens is driven.

E) A focusing system containing an optical system including a first focus lens and a second focus lens, the optical system moving forward and backward along an optical axis to regulate a focus state of a subject image, the focusing system including:

a determining unit for periodically detecting the focus state of the subject image formed via the first focus lens and the second focus lens and comparing detected results to determine a focus position of the optical system;

a first drive control unit for controlling the first focus lens to move slightly forward and backward along the optical axis for the determining unit determining a position where the subject image is in-focus;

a second drive control unit for controlling the second focus lens to move along the optical axis in order to assist regulation of the focus state of the subject image by the first focus lens; and a control unit for controlling the second drive control unit to drive the second focus lens at a constant speed after a center position of moving the first focus lens slightly forward and backward shifts.

F) A focusing system, including:

a focus lens moving forward and backward along an optical axis to regulate a focus state of a subject image;

a determining unit for periodically detecting the focus state of the subject image formed via the focus lens and comparing the detected results to determine a focus position of the optical system;

a drive control unit for controlling the focus lens to move along the optical axis based on the determined result of the determining unit so that the subject image is set in an in-focus state; and a control unit for controlling the drive control unit to drive the focus lens, by selecting either one of a silent mode for giving preference to suppression of operation sounds and a high-accuracy mode for giving priority to accuracy of the determined result according to a progressing state during the determination of the focus position of the subject image by the determining unit.

INDUSTRIAL APPLICABILITY

The focusing system of the present invention can be applied to any focusing system that is installed in a digital camera, a camcorder with an autofocus detecting function, and a mobile telephone with a camera.

EXPLANATIONS OF REFERENCE SIGNS

1: digital camera
2: interchangeable lens unit
3: camera body
10: body microcomputer
11: imaging sensor
20: display unit
40: lens microcomputer
41: focus lens drive controller
42: diaphragm drive controller
62: diaphragm unit
63: first focus motor
64: second focus motor
65: third focus motor
L: optical system
G1: first lens group
G2: second lens group (sub group focus lens)
G3: third lens group
G4: fourth lens group (main group focus lens)
G5: fifth lens group (sub group focus lens)
G6: sixth lens group

The invention claimed is:

1. A focusing system having an optical system including first and second focus lenses for regulating a focus state of a subject image, the focusing system being capable of performing a focus operation for automatically controlling the first and second focus lenses on a focus position, the focusing system comprising:
   a first drive unit configured to drive the first focus lens along an optical axis;
   a second drive unit configured to drive the second focus lens along the optical axis;
   a determining unit configured to periodically detect a focus state of the subject image formed via the optical system and determine a focus position of the optical system based on the detected result in the focus operation; and
   a control unit configured to control the first and second drive units according to a result of determining the focus position of the optical system by the determining unit,
   wherein, the control unit controls the first drive unit to drive the first focus lens periodically forward and backward along the optical axis and controls the second drive unit to drive the second focus lens periodically forward and backward along the optical axis and independently of the first focus lens, in order to detect a focus state of the subject image by the determining unit in the focus operation,
   the second focus lens has tracking positions corresponding to positions of the first focus lens, which provide suitable optical performance according to positions of the first focus lens, and
   the control unit controls the second drive unit to drive the second focus lens periodically forward and backward along the optical axis and independently of the first focus lens in the focus operation at a constant speed so as not to trace the tracking position corresponding to the position of the first focus lens.

2. The focusing system according to claim 1, wherein the control unit controls the first drive unit to drive the first focus lens periodically forward and backward along the optical axis and controls the second drive unit to drive the second focus lens at a constant speed, in order to determine the focus position of the optical system by the determining unit.

3. The focusing system according to claim 1, wherein the control unit controls the second drive unit to drive the second focus lens along the optical axis in order to assist the regulation of the focus state of the subject image by the first focus lens.

4. An image-capturing device comprising the focusing system according to claim 1.

5. An interchangeable lens mountable to a camera body, comprising the focusing system according to claim 1.

* * * * *